US008215066B2

(12) United States Patent
Hosking et al.

(10) Patent No.: US 8,215,066 B2
(45) Date of Patent: Jul. 10, 2012

(54) MULTI-LAYER, REVOLVING STADIUM ROOF

(75) Inventors: Lee Hosking, Doha (QA); Michael Edward Beaven, St. Albans (GB)

(73) Assignee: Qatar Football Association, West Bay, Doha (QA)

( * ) Notice: Subject to any disclaimer, the term of this patent is extended or adjusted under 35 U.S.C. 154(b) by 57 days.

(21) Appl. No.: 12/955,532

(22) Filed: Nov. 29, 2010

(65) Prior Publication Data

US 2012/0131859 A1 May 31, 2012

(51) Int. Cl.
*E04B 1/346* (2006.01)

(52) U.S. Cl. ............ 52/66; 52/6; 52/64; 52/65; 52/81.2; 52/653.1

(58) Field of Classification Search .................. 52/6, 64, 52/65, 66, 80.1, 81.2, 81.4, 82, 86, 648.1, 52/653.1
See application file for complete search history.

(56) References Cited

U.S. PATENT DOCUMENTS

| 3,354,591 | A | * | 11/1967 | Fuller | 52/81.2 |
| 4,104,185 | A | | 8/1978 | Schroder | |
| 4,133,150 | A | * | 1/1979 | Yacoboni | 52/81.2 |
| 4,452,848 | A | | 6/1984 | Geiger | |
| 4,594,470 | A | * | 6/1986 | Headrick | 136/246 |
| 4,716,691 | A | * | 1/1988 | Allen et al. | 52/6 |
| 4,727,688 | A | * | 3/1988 | Kida et al. | 52/6 |
| 4,776,139 | A | * | 10/1988 | Lockwood | 52/82 |
| 5,007,214 | A | * | 4/1991 | Itami et al. | 52/66 |
| 5,027,564 | A | * | 7/1991 | Lechner | 52/2.23 |
| 5,058,332 | A | * | 10/1991 | Masuyama et al. | 52/66 |
| 5,062,243 | A | * | 11/1991 | Kumagai | 52/66 |
| 5,070,659 | A | | 12/1991 | Brisbin et al. | |
| 5,117,594 | A | * | 6/1992 | Muramoto et al. | 52/66 |
| 5,167,097 | A | * | 12/1992 | Robbie et al. | 52/6 |
| 5,257,485 | A | * | 11/1993 | Kawaguchi et al. | 52/66 |
| 5,351,449 | A | * | 10/1994 | Allen et al. | 52/6 |
| 5,390,688 | A | * | 2/1995 | Lipman | 135/97 |
| 5,394,659 | A | * | 3/1995 | Kawaguchi et al. | 52/66 |

(Continued)

FOREIGN PATENT DOCUMENTS

EP 0244213 A2 11/1987

(Continued)

OTHER PUBLICATIONS

International Search Report and Written Opinion date mailed Aug. 23, 2011; PCT/IB2010/003193.

(Continued)

*Primary Examiner* — Brian Glessner
*Assistant Examiner* — Joshua Ihezie
(74) *Attorney, Agent, or Firm* — SNR Denton US, LLP

(57) ABSTRACT

A revolving canopy roof for a stadium includes a fixed half dome and revolving half dome. The fixed half dome has an outer layer clad with a plurality of shading tents, the plurality of shading tents comprising a plurality of triangular shading panels, an inner layer clad with a plurality of triangular ethylene tetraflouroethylene panels, and a plurality of bracing elements connecting the outer layer to the inner layer. The revolving half dome includes an outer layer clad with a plurality of shading tents, the plurality of shading tents comprising a plurality of triangular shading panels, an inner layer clad with a plurality of triangular ethylene tetraflouroethylene panels, and a plurality of bracing elements connecting the outer layer to the inner layer.

20 Claims, 26 Drawing Sheets

U.S. PATENT DOCUMENTS

| | | | |
|---|---|---|---|
| 5,483,774 A * | 1/1996 | Siemerink et al. | 52/81.2 |
| 5,577,350 A * | 11/1996 | Brisbin et al. | 52/6 |
| 5,625,982 A * | 5/1997 | Foote | 52/64 |
| 5,904,003 A * | 5/1999 | Stephen | 52/6 |
| 6,065,252 A * | 5/2000 | Norsen | 52/66 |
| 6,754,994 B2 * | 6/2004 | Jahanpour | 52/66 |
| 7,263,805 B2 * | 9/2007 | Chapus | 52/67 |
| 7,464,900 B2 * | 12/2008 | Clark et al. | 244/171.7 |
| 7,992,348 B2 * | 8/2011 | Fritzel et al. | 52/2.11 |
| 2003/0019166 A1 * | 1/2003 | Sprung | 52/64 |
| 2004/0187397 A1 * | 9/2004 | Chapus | 52/67 |
| 2005/0204681 A1 * | 9/2005 | Zeigler | 52/646 |
| 2008/0229704 A1 * | 9/2008 | Augustyniak et al. | 52/782.1 |

FOREIGN PATENT DOCUMENTS

| | | |
|---|---|---|
| EP | 0342147 A1 | 11/1989 |
| FR | 2673217 A1 | 8/1992 |
| GB | 2453552 A | 4/2009 |
| JP | 56-117027 A | 9/1981 |
| JP | 2-085438 A | 3/1990 |
| JP | 2-248545 A | 10/1990 |
| JP | 3-087528 A | 4/1991 |
| JP | 7-229226 A | 8/1995 |
| JP | 7-279459 A | 10/1995 |
| WO | WO 93/25777 A1 | 12/1993 |
| WO | WO 96/25572 A2 | 8/1996 |
| WO | WO 2008/060196 A1 | 5/2008 |
| WO | WO 2010/092391 A1 | 8/2010 |

OTHER PUBLICATIONS

International Search Report and Written Opinion date mailed Oct. 28, 2011; PCT/IB2010/003214.

International Search Report and Written Opinion date mailed Aug. 23, 2011; PCT/IB2010/003213.

International Search Report and Written Opinion date mailed Aug. 24, 2011; PCT/IB2010/003194.

International Search Report and Written Opinion date mailed Oct. 5, 2011; PCT/IB2010/003174 [0010].

* cited by examiner

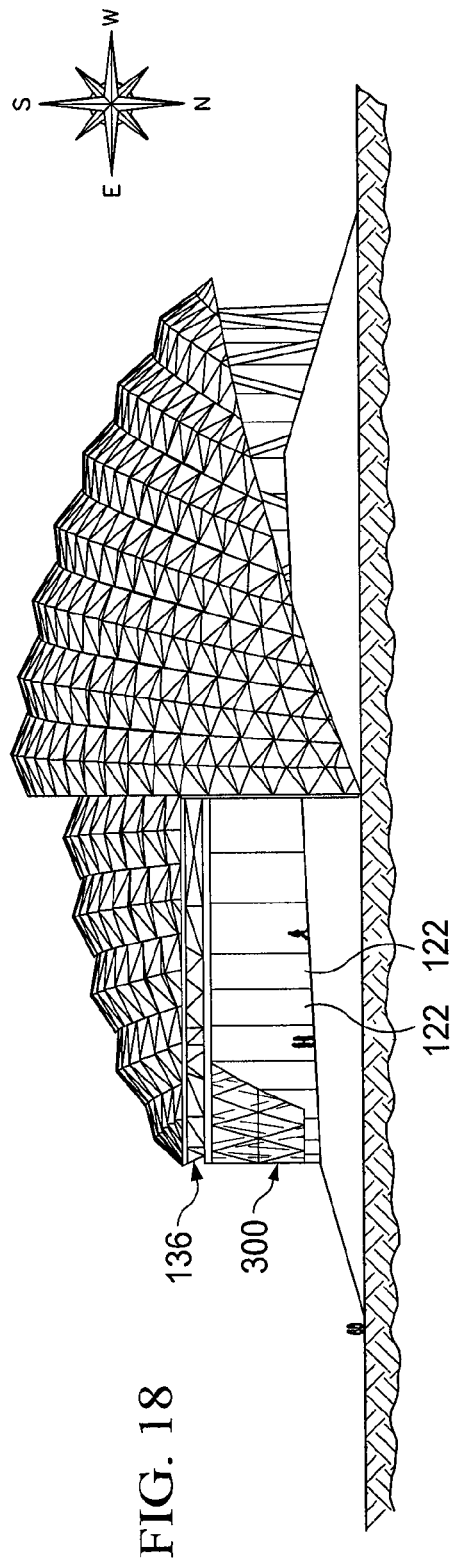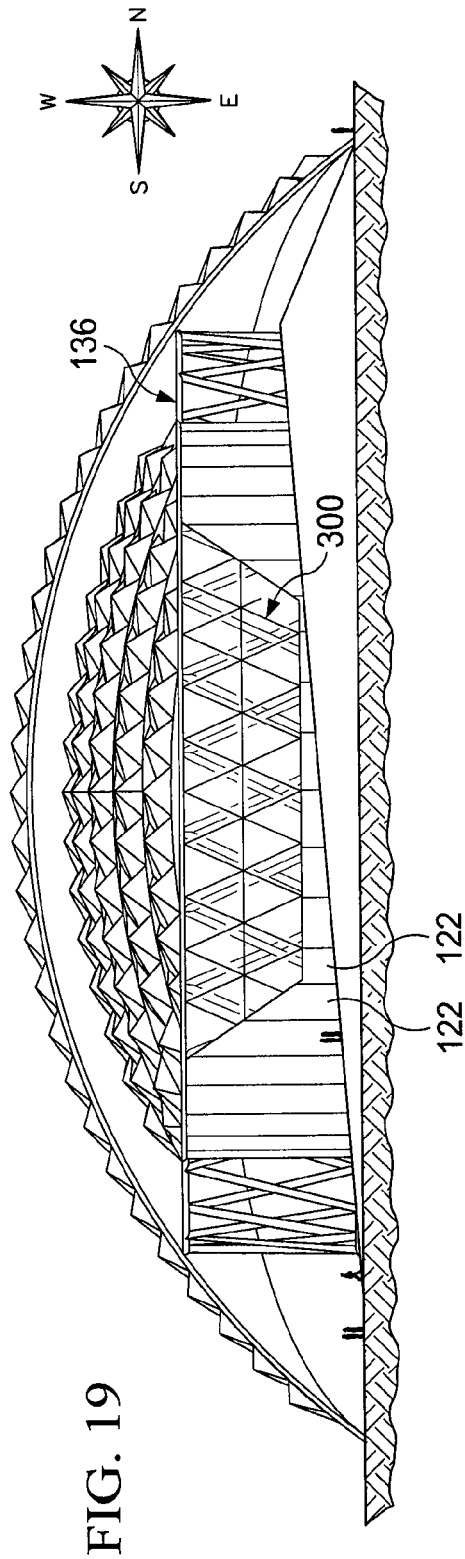
FIG. 18
FIG. 19

MULTI-LAYER, REVOLVING STADIUM ROOF

BACKGROUND OF THE INVENTION

1. Field of the Invention

The present invention relates generally to stadium roofs, and more particularly, to convertible stadium roofing systems, apparatuses, and methods for passively reducing stadium's energy demands.

2. Description of Related Art

Harsh climates or weather conditions may preclude the use of open-air facilities while staging a sporting event. However, many sporting events are traditionally played outdoors. Thus, stadiums may implement a convertible roofing system that may be closed in inclement weather and open when the weather permits comfortable conditions within the stadium.

SUMMARY OF THE INVENTION

The problems presented by existing convertible roofing systems are addressed by the systems, apparatuses, and methods of the illustrative embodiments described herein. In one embodiment, a revolving canopy roof for a stadium is presented. The roof includes a fixed half dome and revolving half dome. The fixed half dome has an outer layer clad with a plurality of shading tents, the plurality of shading tents comprising a plurality of triangular shading panels, an inner layer clad with a plurality of triangular ethylene tetraflouroethylene panels, and a plurality of bracing elements connecting the outer layer to the inner layer such that the plurality of bracing elements offsets the outer layer from the inner layer to permit airflow between the outer layer and the inner layer. The revolving half dome includes an outer layer clad with a plurality of shading tents, the plurality of shading tents comprising a plurality of triangular shading panels, an inner layer clad with a plurality of triangular ethylene tetraflouroethylene panels, and a plurality of bracing elements connecting the outer layer to the inner layer such that the plurality of bracing elements offsets the outer layer from the inner layer to permit airflow between the outer layer and the inner layer.

In an other illustrative embodiment, a stadium having a rotatable roof is presented. The roof includes a fixed half dome roof having a first center point and a rotatable half dome roof having a second center point coincident with the first center point. The fixed half dome roof includes a curved inner framework having a first side and a second, opposing side, a plurality of ethylene tetrafluroethylene pillows positioned on the second side of the curved inner framework, a curved intermediate framework having a first side and a second, opposing side. The first side of the curved intermediate framework is connected to the second side of the curved inner framework and the curved intermediate framework is a trussed configuration. The fixed half dome further including a curved secondary framework having a first side and a second, opposing side. The first side of the secondary intermediate framework is positioned on the second side of the curved intermediate framework, and a plurality of solar hoods supported by the curved secondary framework. The plurality of solar hoods are cascaded along the curved secondary framework. The rotatable half dome includes a curved inner framework having a first side and a second, opposing side, a plurality of ethylene tetrafluroethylene pillows positioned on the second side of the curved inner framework, a curved intermediate framework having a first side and a second, opposing side. The first side of the curved intermediate framework is connected to the second side of the curved inner framework and the curved intermediate framework is a trussed configuration. The fixed half dome further including a curved secondary framework having a first side and a second, opposing side. The first side of the secondary intermediate framework is positioned on the second side of the curved intermediate framework, and a plurality of solar hoods supported by the curved secondary framework. The plurality of solar hoods are cascaded along the curved secondary framework. The rotatable half dome roof rotates relative to the fixed half dome roof.

In another illustrative embodiment, a stadium having a passive dome roof designed for reducing energy demand on the stadium is presented. The passive dome roof includes an outer geodesic dome, an outer geodesic frame, a geodesic truss, and an inner geodesic dome. The outer geodesic dome has a plurality of cascading tents for reflecting thermal energy from a sun while allowing natural light and ventilation to permeate the outer geodesic dome. Each tent has an opening to the atmosphere. The plurality of cascading tents have a number of different sizes dependent on the roof's curvature the plurality of cascading tents. The outer geodesic frame supports the plurality of cascading tents. The geodesic truss connects to a stadium wall support and supports the outer geodesic frame. The inner geodesic dome is supported by the geodesic truss and includes a plurality of triangulated, transparent ethylene tetrafluoethylene membranes and a framework. The perimeter of each triangulated, transparent ethylene tetraflouethylene membrane is supported by the framework. The framework further functions as a gutter.

Other objects, features, and advantages of the illustrative embodiments will become apparent with reference to the drawings and detailed description that follow.

BRIEF DESCRIPTION OF THE DRAWINGS

Illustrative embodiments of the present invention are described in detail below with reference to the attached drawing figures, which are incorporated by reference herein and wherein:

FIG. 18 illustrates one embodiment of a North elevation, side view of the stadium of FIG. 2;

FIG. 19 illustrates one embodiment of an East elevation, side view of the stadium of FIG. 2;

DETAILED DESCRIPTION OF THE DRAWINGS

In the following detailed description of several illustrative embodiments, reference is made to the accompanying drawings that form a part hereof, and in which is shown, by way of illustration, specific embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is not to be taken in a limiting sense, and the scope of the present invention is defined only by the appended claims. Unless otherwise indicated, as used herein, "or" does not require mutual exclusivity.

Figure 1:
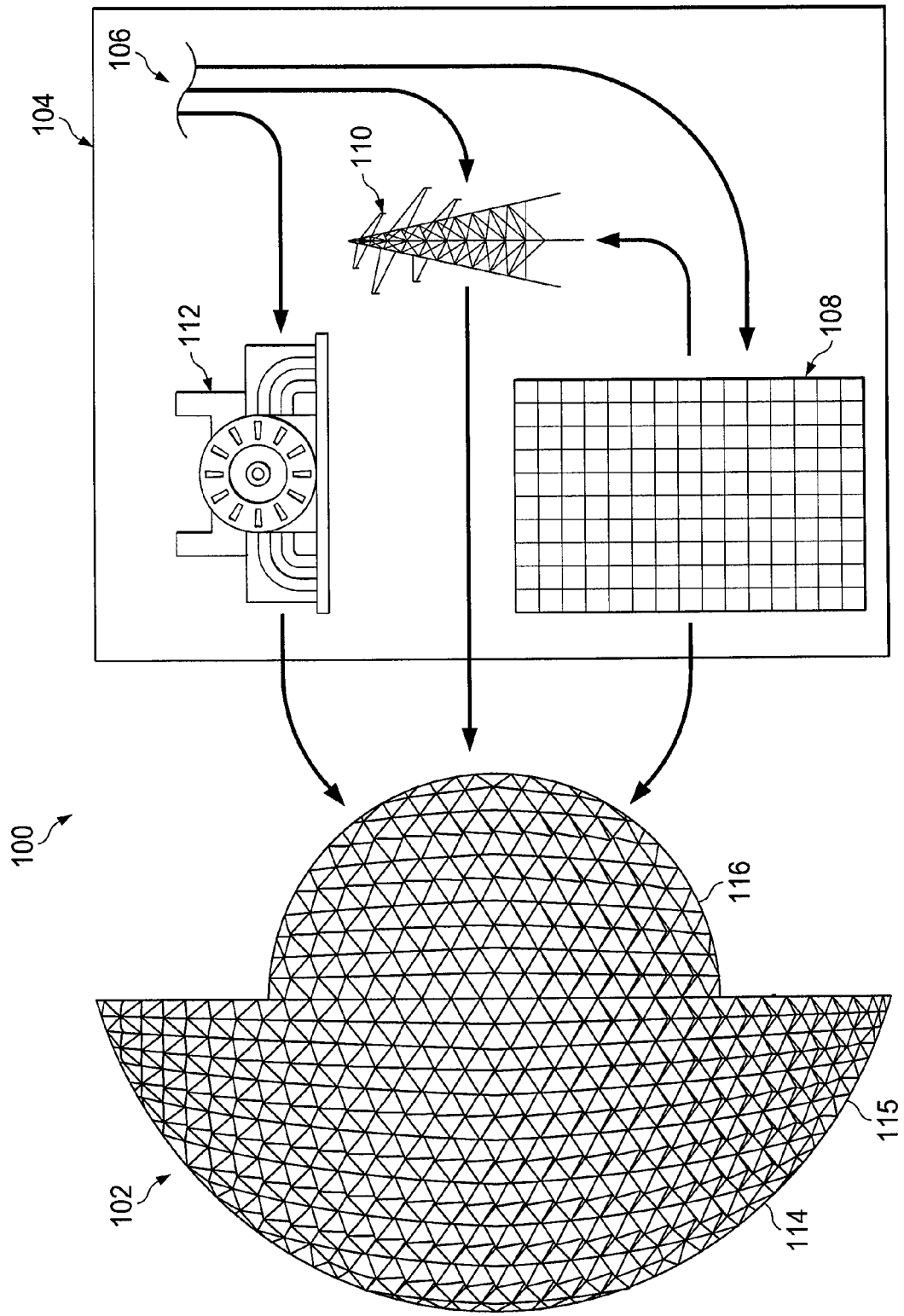
FIG. 1 illustrates a schematic diagram, of a zero carbon stadium infrastructure, according to an illustrative embodiment.

Referring now to FIG. 1, an illustrative embodiment of a zero carbon stadium infrastructure 100 having a stadium 102 with a zero-carbon energy infrastructure 104 is presented.

The stadium 102 may be powered by any one of a combination of power sources 106 for effectively providing a zero-carbon energy infrastructure 104. The combination of power sources 106 may include a solar farm 108, a public or national power grid 110, or a bio-diesel generator 112. The stadium 102 may be convertible from an indoor stadium to an outdoor stadium via a moveable roofing system 114. The moveable roofing system 114 includes a fixed portion 115 and a moveable portion 116. The stadium 102 allows sporting events to be played with the feeling of being outside, while acknowledging that extreme temperatures or unfavorable weather conditions may preclude the use of an outdoor, or open-air stadium. The stadium 102 may also be referred to as an indoor/outdoor stadium.

The zero carbon stadium infrastructure 100 presents a future for stadiums to be powered by sustainable energy infrastructures. Sustainability is a broad subject, covering environment, economic, and social issues. However, for purposes of this application, the term "sustainable" is limited to environmental impacts and energy consumption. The term "zero carbon infrastructure" means that the zero carbon energy infrastructure harnesses sufficient energy from renewable resources to provide power to entirely offset the energy used by the infrastructure. In one embodiment the renewable resource is from the sun. In this embodiment, solar energy is captured and converted to electrical energy and thermal energy for cooling. The electrical energy is supplied to the stadium 102, exported to a public grid and re-imported when the stadium 102 demands, or a combination of the above. While the stadium 102 is shown as part of the zero carbon stadium infrastructure 100, it should be understood that the stadium 102 may be used with any available power source and is not limited to renewable energy sources or zero carbon power sources. For example, the stadium 102 may be run on fossil fuels.

Referring now to FIGS. 2-5, an illustrative embodiment of the indoor/outdoor stadium 102 is presented. The stadium 102 may be arranged in a circular plan having a circular facade 136 that encompasses a pitch or playing field 118 large enough to accommodate a regulation sized 5-a-side football field, also referred to in some parts of the world as a soccer field. The circular facade 136 provides an efficient and simple geometry that provides flexibility when choosing land development sites and may further provide flexibility in sizing the stadium 102 to be smaller or larger. The pitch 118 will preferably be comprised of natural grass, such as Bermuda grass varietals, but it should be appreciated that the pitch 118 may also be an artificial grass.

The pitch 118 is surrounded by the circular façade 136. The circular façade 136 includes a first plurality of support columns 144 supporting a first roof support 146 and a second plurality of support columns 126 supporting a second roof support 138. The first and second plurality of support columns 144, 126 may be comprised of raking steel columns that may be positioned in a "V" formation. The "V" formation may contribute to the stability of the stadium 102. The first plurality of support columns 144 includes a first end 180 connected to a stadium foundation 182, and a second end 184 connected to the first roof support 146. The second plurality of support columns 126 includes a first end 186 also connected to the stadium foundation 182, and a second end 188 connected to the second roof support 138.

A plurality of wall panels 122 may be clad to the first and second plurality of support columns 144, 126. The plurality of wall panels 122 may be various sizes and may be curved pre-cast concrete panels. In one embodiment, the plurality of wall panels 122 includes a plurality of standard wall panels 123 and a plurality of dwarf wall panels 125. The plurality of standard wall panels 123 may be a height, h1 greater than a height, h2 of the plurality of dwarf wall panels 125. In a non-limiting illustration, the height, h1 of the standard wall panels 123 may be approximately 9 meters and the height, h2, of the dwarf wall panels 125 may be approximately 3 meters.

The plurality of dwarf wall panels 125 may be positioned adjacent the plurality of standard wall panels 123 to form an opening 142. The opening 142 may be covered by a curtain system having a screen 124. The screen 124 may be positioned on the Eastern side of the circular façade 136 and may retract horizontally along the circular façade 136 to expose the opening 142 to the outside when external weather conditions permit natural ventilation. In an open position the screen 124 will expose the opening 142 to the outside environment which may allow for ventilation and natural lighting. In the closed position, the screen 124 will provide a transparent barrier that protects an interior space 134 of the stadium 102 from exterior elements such as the weather. The screen 124 is transparent allowing natural sunlight to filter into the stadium 102 and spectators from within the stadium 102 to view the environment outside the stadium 102. The screen 124 may be comprised of an ethylene tetraflouroethylene (ETFE) material. Alternatively, the screen 124 may be made of insulated glass units. The screen 124 will be discussed in more detail below with regard to FIGS. 12-13 and 15-21 curtain system 300.

The stadium 102 further comprises a seating tribune 128 from which spectators may view an event taking place on the pitch 118. The seating tribune 128 is configured to provide spectators with an unobstructed view of the pitch 118. The seating tribune 128 may be referred to as stadium seating, tiered seating, or cascaded seating. The seating tribune 128 will be described in more detail below with reference to FIGS. 22A-25 The seating tribune 128, the pitch 118, and other internal components of the stadium 102, which may be referred as the interior space 134, are surrounded by the circular façade 136 and are covered by the moveable roofing system 114.

The moveable roofing system 114 is a spherical dome structure comprising a fixed half dome 130, also referred to as the fixed portion 115, and a rotatable half dome 132, also referred to as the moveable portion 116. The rotatable half dome 132 rotates relative to the fixed half dome 130 to any number of positions ranging from 0 to 180 degrees. In one embodiment, the rotatable half dome 132 may rotate relative to the fixed half dome 130 to any number of positions ranging from 0 to 360 degrees. The rotation of the rotatable half dome 132 relative to the fixed half dome 130 allows the moveable roofing system 114 to be in a fully open position, a fully closed position, or a position somewhere between fully open or fully closed. The moveable roofing system 114 is configured to provide general protection against the weather that may include shade and thermal insulation against the sun. The moveable roofing system 114 may help maintain a controlled environment within the stadium 102 and may be moved based on current and predicted weather conditions.

Certain aspects of the stadium 102 will be described in more detail below. For example, a moveable roofing system, a multi-layer roof, a curtain system, a microclimate cooling system, a solar farm, and a control system may be aspects of the stadium 102 and will be described below in more detail. The above mentioned aspects of the stadium 102 may be used individually or in combination to passively reduce the energy demand of the stadium 102 to contribute to the sustainable future of the stadium 102.

Referring now to FIGS. 2-13, an illustrative embodiment of the moveable roofing system 114 is presented in more detail. As previously stated, the moveable roofing system 114 may help maintain a controlled environment within the stadium 102. The term "moveable roof" is not meant to be limiting, for example, the moveable roofing system 114 may also be described as a revolving roof, a rotatable roof, or a retractable roof. The moveable roofing system 114 may be one aspect of the overall stadium 102 design that contributes to a passive reduction of energy usage.

As previously stated, the moveable roofing system 114 includes the fixed half-dome 130 and the rotatable half dome 132. The fixed half-dome 130 is fixed to and supported by the first roof support 146 such that the fixed half dome 130 does not move. The fixed half dome 130 has a center point 148. The first roof support 146 may be a semi-circular ring beam. The rotatable half dome 132 rotates about and is supported by a second roof support 138. The rotatable half dome 132 has a center point 149. The second roof support 138 may be a circular ring beam. The first roof support 146 and the second roof support 138 may be positioned at approximately roof height 140. Additionally, the center points 148, 149 may be coincident. In one, specific, non-limiting embodiment, the roof height 140 is approximately 9 meters above the pitch 118. The first roof support 146 may be substantially coplanar with the second roof support 138. In another embodiment, the first roof support 146 may be higher or lower than the second roof support 138. For example, the first roof support 146 might be higher or lower than the second roof support 138 by approximately 1 meter.

The first roof support 146 may be concentric to the second roof support 138. As the rotatable half dome 132 rotates about the second roof support 138, the rotatable half dome 132 is rotating relative to the fixed half dome 130 and may completely retracted beneath the fixed half dome 130. Thus, the fixed half dome 130 may be referred to as an outer half dome and the rotatable half dome 132 may be referred to as an inner half dome. The rotatable half dome 132 and the fixed half dome 130 are configured such that rotatable half dome 132 rotates relative to the fixed half dome 130 without interference. As shown in a specific, non-limiting embodiment, the first roof support 146 has a first diameter 150 greater than a second diameter 152 of the second roof support 138. In this embodiment the fixed half dome 130 also has a first height 154 greater than a second height 156 of the rotatable half dome 132. The first height 154 is sufficiently greater than the second height 156 such that the rotatable half dome 132 rotates beneath the fixed half dome 130 without interference. As previously mentioned, the rotatable half dome 132 may retract beneath the fixed half dome 130. In another embodiment (not shown), the rotatable half dome 132 has a diameter greater than the fixed half dome 130 such that the rotatable half dome 132 rotates about the exterior of the fixed half dome 130.

The rotatable half dome 132 may rotate about the second roof support 138 anywhere from approximately 0 degrees up to a full 360 degrees in any direction. The rotatable half dome 132 may be configured to move to a plurality of positions based on current and predicted weather conditions. Additionally, the rotatable half dome 132 may at least partially retract beneath the fixed half dome 130 to provide natural ultra-violet photosynthesis to the natural grass pitch 118. For example, the rotatable half dome 132 may rotate 180 degrees about the second roof support 138, or the rotatable half dome 132 may rotate 360 degrees about the second roof support 138. Likewise, the rotatable half dome 132 may rotate either clockwise or counterclockwise about the second roof support 138. In a specific, non-limiting embodiment, the rotatable half dome 132 rotates clockwise 180 degrees to open. In an open position 178, shown at least in FIGS. 6, 8, and 9, the rotatable half dome 132 is fully retracted beneath the fixed half dome 130. To close, the rotatable half dome 132 rotates 180 degrees counterclockwise. In a closed position 176, shown in at least FIGS. 7, 10, and 11, the fixed half dome 130 and the rotatable half dome 132 cover the interior 134 of the stadium 102. In the closed position 176, the rotatable half dome 132 may be located directly above the pitch 118 and the fixed half dome 130 may be located directly above the seating tribune 128. In one embodiment, the fixed half dome 130 is on the West side of the stadium 102. Thus, the rotatable half dome 132 may be on the East or West side of the stadium 102 depending on whether the stadium 102 is in the open or closed position 178, 176.

The rotatable half dome 132 further includes a leading edge 159. The leading edge 159 includes a first end 160 and a second, opposing end 162. The first end 160 may diametrically oppose the second end 162. The rotatable half dome 132 may further include a tie cable 158 that connects the first end 160 of the leading edge 159 to the second end 162 of the leading edge 159. The tie cable 158 horizontally stabilizes the rotatable half dome 132 by restraining the first end 160 of the rotatable half dome 132 to the second end 162 of the rotatable half dome 132. To avoid sagging of the tie cable 158, the tie cable 158 is supported by a plurality of vertical cables 163 connected to the leading edge 159. The lengths of the plurality of vertical cables 163 are such that the tie cable 158 may appear curved. Under normal design loads the tie cable 158 will just avoid going slack. However, if an uplift, or an upward wind force is presented to the rotatable half dome 132, the tie cable 158 may be allowed to go slack without harm to the rotatable half dome 132 because the rotatable half dome 132 is configured to withstand the uplift under normal rated operating conditions.

The fixed half dome 130 further includes a leading edge 190 that has a first end 192 and a second, opposing end 194. The fixed half dome 130 may extend beyond the first roof support 146 towards the ground. In one embodiment, the fixed half dome 130 tangentially extends beyond the first roof support 146 towards the ground. The first end 192 of the leading edge 190 is connected to the ground at a first position 196 and the second end 194 of the leading edge 190 is connected to the ground at a second position 198. The first end 192 may be diametrically opposed to the second end 194.

In both the open and closed position 176, 178, the leading edge 159 of the fixed half dome 130 and the leading edge 190 of the rotatable half dome 132 are substantially coplanar. Further, in the closed position 176, the leading edge 159 of the fixed half dome 130 and the leading edge 190 of the rotatable half dome 132 are substantively on opposing sides of the same plane.

Figure 12:
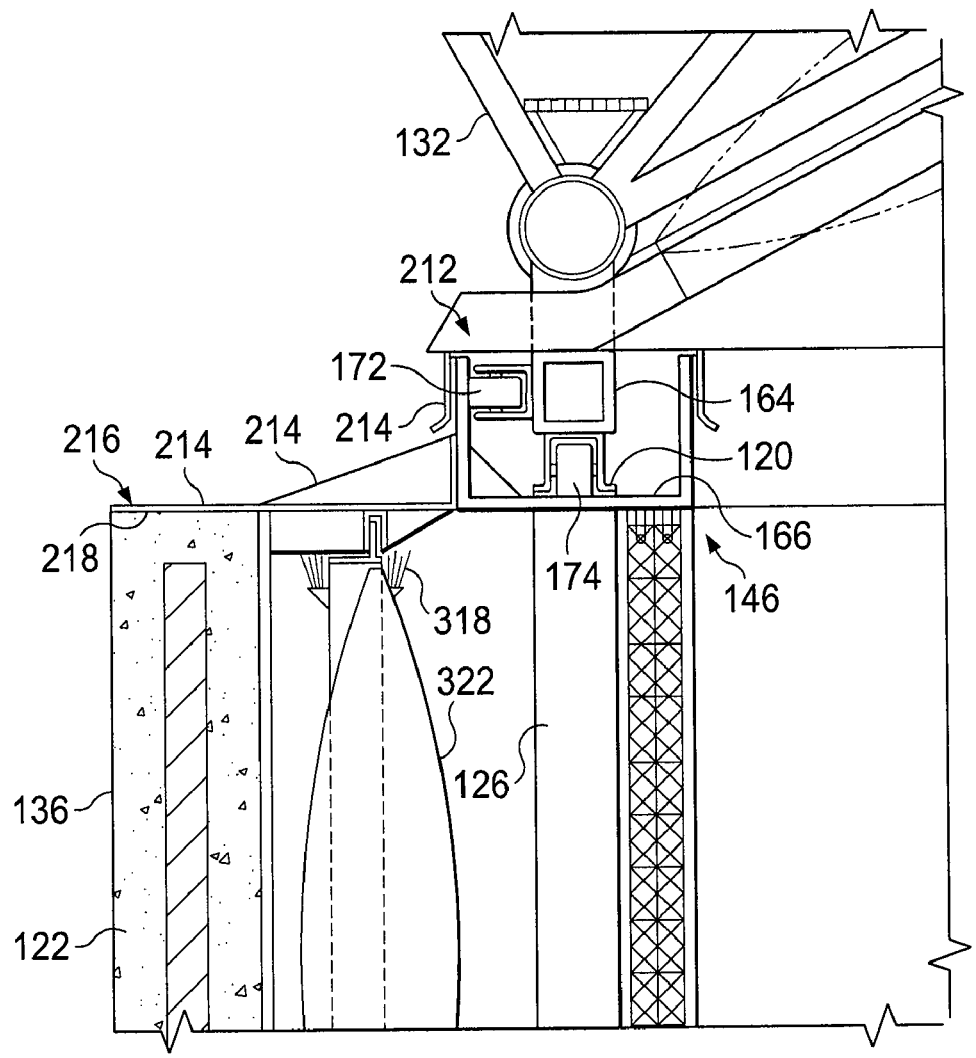
FIG. 12 illustrates a detailed, cross-sectional view of one embodiment of a wheel mechanism and a curtain system.
Figure 13:
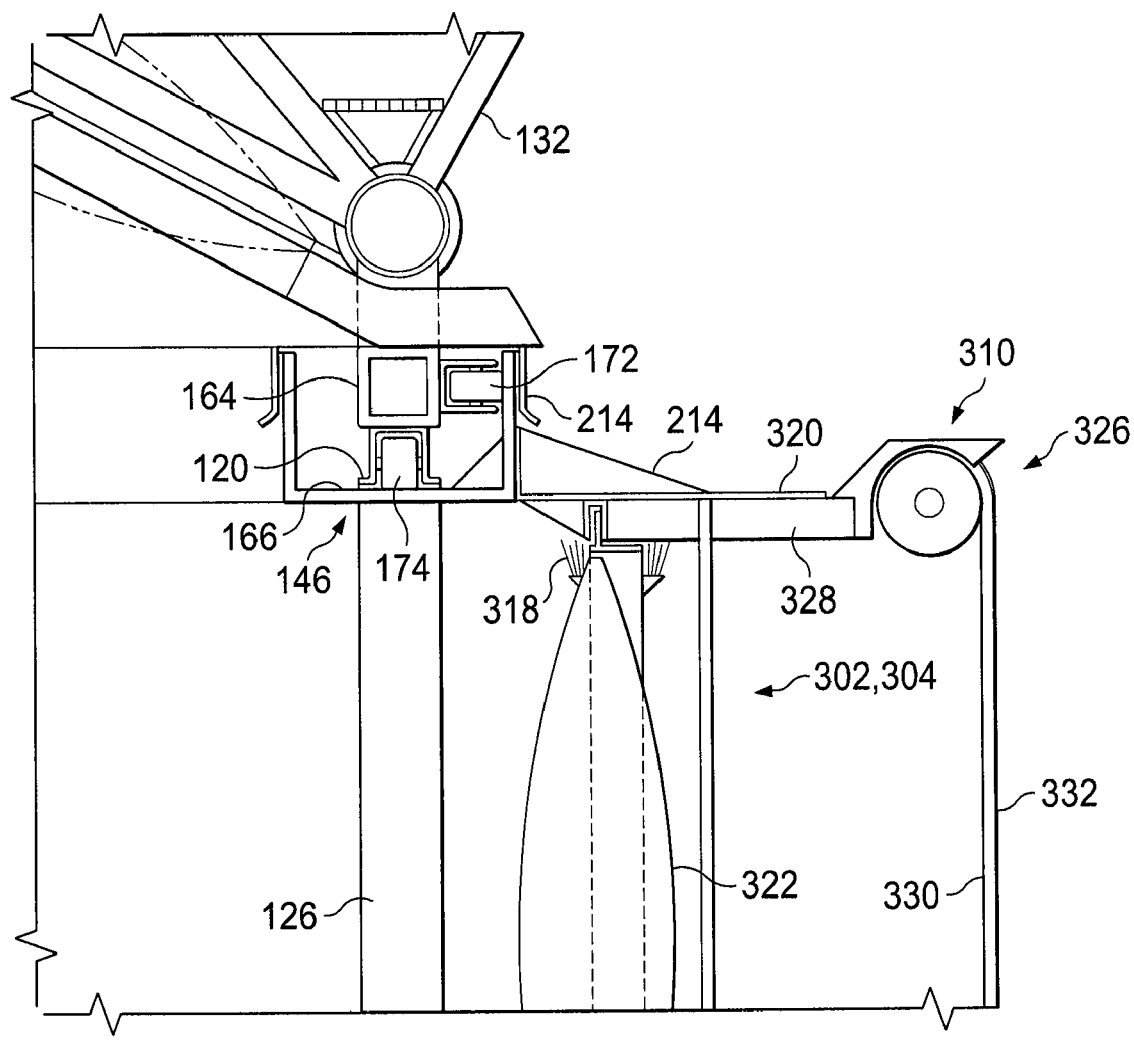
FIG. 13 illustrates a detailed view of one embodiment of a wheel mechanism and a curtain system.
Figure 14A:
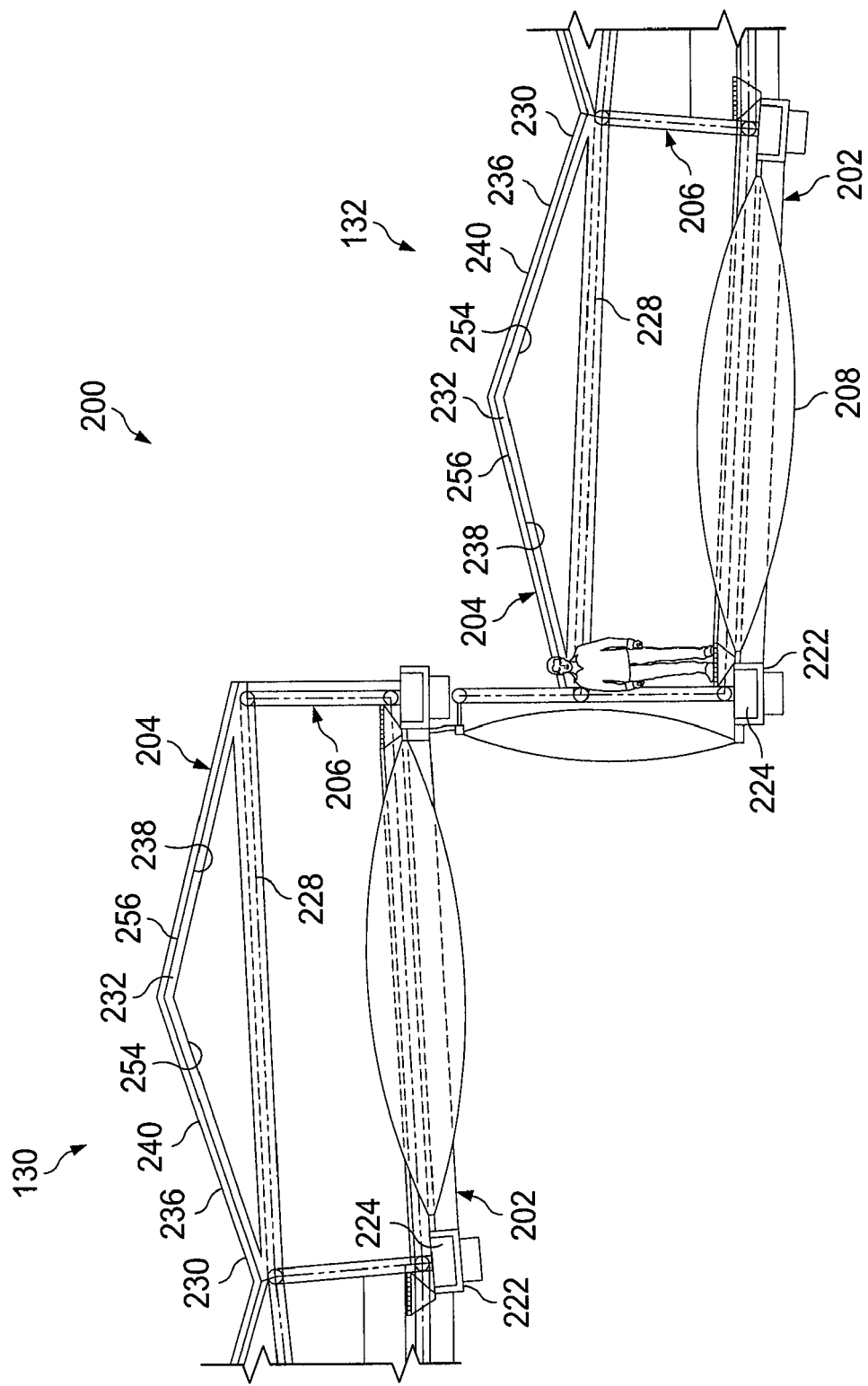
FIG. 14A illustrates one embodiment of a multi-layer roof.
Figure 14B:
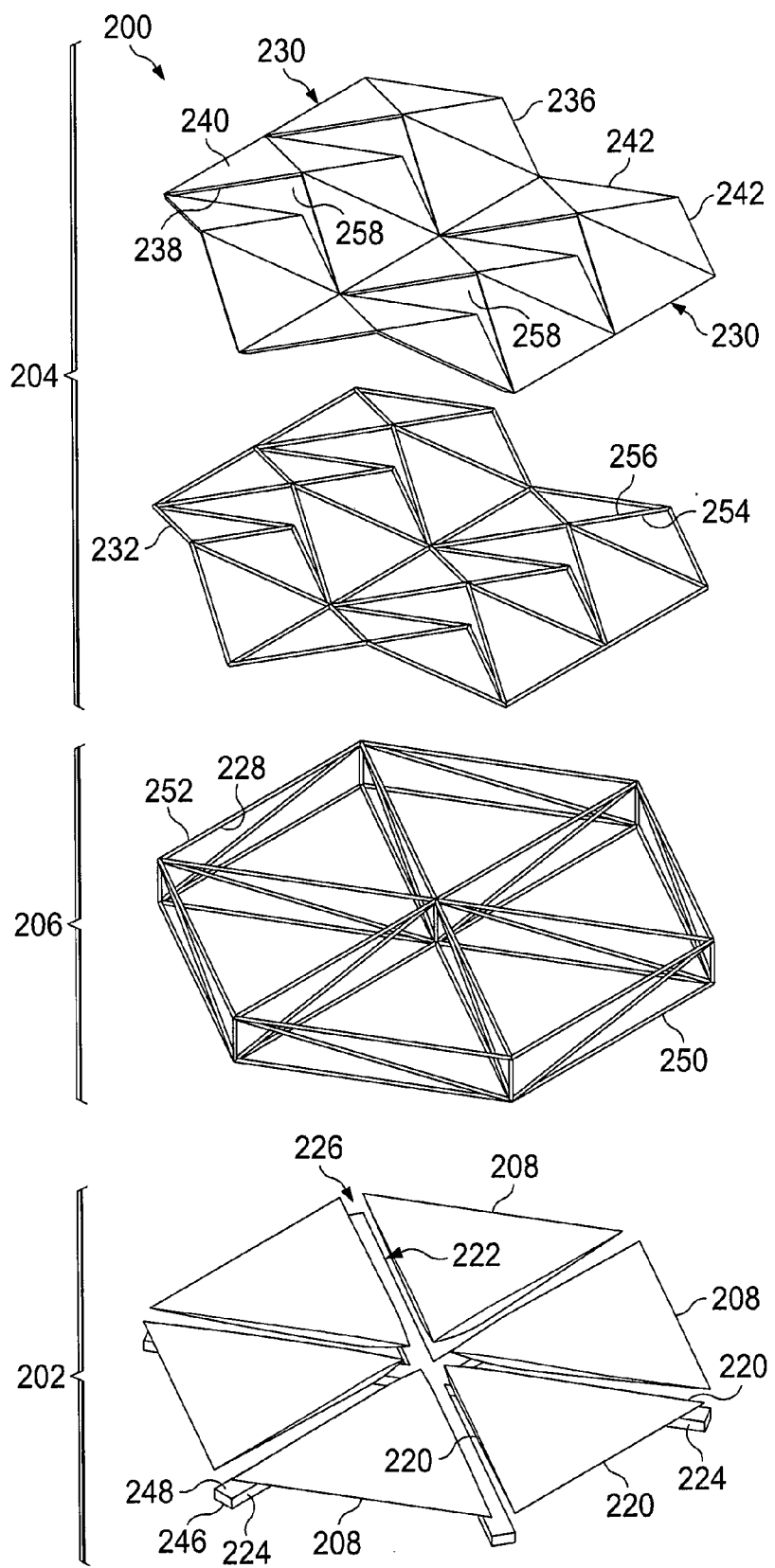
FIG. 14B illustrates an exploded view of the multi-layer roof of FIG. 14A.

Referring still to FIGS. 4-13, but with specific reference to FIGS. 12 and 13, the rotatable half dome 132 is connected to a plurality of wheel or bearing mechanisms 164 that are positioned within a channel 166 of the second roof support 138. The rotatable half dome 132 is slideably connected to the second roof support 138. The channel 166 is positioned along the circumference 168 of the second roof support 138. As previously mentioned, the second roof support 138 is supported by the second plurality of support columns 126. The second plurality of support columns 126 will avoid going into tension under rated operating conditions when the rotatable half dome 132 is presented with an uplift force. Any horizontal forces transmitted from the moving half dome to the second roof support 138 may be minimized by the tie cable 158 which will help transmit horizontal forces back into the second roof support 138. The rotatable half dome 132 is sufficiently stiff so that the rotatable half dome 132 does not rely on the second roof support 138 to take horizontal forces from the rotatable half dome 132. However, there will inevitably be some horizontal load transfer from the rotatable half dome 132 to the second roof support 138 due to the relative stiffness of both the rotatable half dome 132 and the second roof support 138. The combination of the support columns being in "V" formation and the circular structure of the second roof support 138 will provide the overall stability for the rotatable half dome 132.

The rotation of the rotatable half dome 132 is achieved by means of the wheel mechanism 164 fixed on a perimeter 170 of the rotatable half dome 132. The wheel mechanism 164 sits in the channel 166 of the second roof support 138 which is used as a track for the wheel mechanism 164. The circular geometry of the rotatable half dome 132 and second roof support 138 allow the dome to be rotated at any desirable angle and from either direction. Under operating conditions, the wheel mechanism 164 should not be required to take any uplift forces. However, a fail-safe railing 120 may be attached to the wheel mechanism 164 to keep the wheel mechanism 164 and, consequently the rotatable half dome 132, from lifting off of the channel 166. In one, non-limiting embodiment, the wheel mechanism 164 includes a horizontal wheel 172 and a vertical wheel 174, the combination of which accommodates eccentric and torsional loading without any deformations in the wheel mechanism 164 having an impact on stability or moveability of the rotatable half dome 132.

Referring now primarily to FIGS. 12-14B, the moveable roofing system 114 will be further described as a multi-layer roof configuration 200 for passively reducing the energy demand on the stadium 102. While the multi-layer roof configuration 200 is described as part of the moveable roofing system 114, it should be appreciated that the moveable roofing system 114 and the multi-layer roof configuration 200 are not dependent upon each other to function. For example, the moveable roofing system 114 may properly function without the multi-layer roof configuration 200, and the multi-layer roof configuration 200 may be applied to a different roofing system other than the moveable roofing system 114 as previously described. The multi-layer roof configuration 200 may be one aspect in an overall stadium 102 design that contributes to a passive reduction of energy usage by the stadium 102.

The multi-layer roof configuration 200 includes an inner layer 202, an outer layer 204, and an intermediate layer 206. The inner layer 202, the outer layer 204, and the intermediate layer 206 may be curved such that the inner, outer, and intermediate layers 202, 204, 206 follow the geodesic geometry of the fixed and rotatable half domes 130, 132.

The inner layer 202 includes a curved inner framework or a carrier frame 222 having a first side 246 and a second, opposing side 248, and a plurality of pillows 208 positioned on the second side 248 of the carrier frame 222. The plurality of pillows 208 of the inner layer 202 may be comprised of a triangulated ethylene tetrafluoroethylene (ETFE) pillow. The inner layer 202 will be fixed to a lower cord 210 (see FIG. 10) of both the fixed half dome 130 and the rotatable half dome 132. The plurality of ETFE pillows 208 fixed to the lower cord 210 of the rotatable half dome 132 may terminate at an interface 212 with the second roof support 138 wherein an insulated flashing 214 may form an impermeable seal 216 over the channel 166 and the wheel mechanism 164. The insulated flashing 214 may also form a closure over a parapet 218 of the circular façade 136.

The plurality of ETFE pillows 208 may be comprised of a 4-layer foil pillow with an applied frit to the outer layer to achieve an overall heat transfer coefficient (U-value) of 1.5 W/(m²K) and a solar heat gain coefficient (G-value) of 0.4. The U-value measures the rate of heat transfer through a building element over a given area, under standardized conditions. The G-value refers to the increase in temperature in a space or object due to solar radiation. The strength of the sun and a materials ability to resist or transmit the solar radiation factors into the G-value. The plurality of pillows 208 will have a number of edges or a perimeter 220 that will be continuously connected to the carrier frame 222. The carrier frame 22 includes condensation trays or a gutter system 224. The number of edges 220 may be clamped to the carrier frame 222. The carrier frame 222 may be made of an extruded aluminum. The plurality of pillows 208 will have a compressed air supply as per manufacturer's instructions. The plurality of pillows 208 may be manufactured by Vector Foiltec.

As installed, the plurality of pillows 208 will be substantially free of wrinkles. At the perimeter 220 of each of the plurality of ETFE pillows 208, the gutter system 224 will collect water run-off. The gutter system 224 will be fixed to the underside of the lower cord 210 of both the fixed and rotatable half domes 130, 132 and may be lined with an unplasticized polyvinyl chloride (uPVC) single ply membrane, or vinyl siding, that will form a continuous impermeable seal to the ETFE frame (not shown). The gutter system 224 will interconnect without obstruction to their cross-sectional area, thereby forming a gutter network 226 that will freely discharge run-off over the outside of the circular façade 136.

The carrier frame 222 will be fixed to the intermediate layer 206 of both the fixed and rotatable half domes 130, 132. The intermediate layer 206 connects the inner layer 202 to the outer layer 204 and provides structural support to both the inner layer 202 and the outer layer 204. In other words, the intermediate layer 206 carries the structural loads from the inner layer 202 and the outer layer 204. The intermediate layer 206 is comprised of a plurality of bracing elements 228 that may be connected in a truss configuration. The intermediate layer 206 may be made of steel components. The intermediate layer 206 offsets the inner layer 202 from the outer layer 204. The outer layer 204 may be offset from the inner layer 202 by approximately 1500 mm. The offset provided by the intermediate layer 206 permits airflow between the inner layer 202 and the outer layer 204. The intermediate layer 206 has a first side 250 and a second, opposing side 252. The first side 250 of the intermediate layer 206 is connected to the second side 248 of the carrier frame 222.

The outer layer 204 includes a plurality of panels 230 supported on a curved secondary frame 232. The plurality of panels 230 may be triangular and may include various sizes. The outer layer 204 is fixed to an outer cord 234 (see FIG. 10) of the fixed and rotatable half dome 130, 132. The outer layer 204 may be shaped so as to minimize the number of different sized panels 230. The outer layer 204 may further be shaped such that the plurality of panels 230 form a circular symmetry approximately every 60 degrees. The number of different sizes needed for the plurality of panels 230 to cover the fixed and rotatable half domes 130, 132 depends on the curvature of the fixed and rotatable half domes 130, 132.

The plurality of panels 230 may be permeable screens of triangulated aluminum composite or polyvinyl chloride material (PVC). The curved secondary frame 232 has a first side 254 and a second, opposing side 256. The first side 254 of the curved secondary frame 232 is connected to the second side 252 of the intermediate layer 206. The curved secondary frame 232 may be made of steel and may provide continuous support to a perimeter 242 of the plurality of panels 230. The outer layer 204 forms solar hoods 236 which may also be referred to as plurality of shading tents. The solar hoods 236, or shading tents, may be overlapped along the curve of the outer layer 204 or cascaded along the curve of the outer layer 204. The overlap between the solar hoods 236 create a plurality of openings 258 that permit air flow and sunlight to filter through the intermediate layer 206. In one embodiment, the plurality of openings 258 face North. In another embodiment, the plurality of openings 258 face South. The positioning of the plurality of openings 258 either North or South is a passive means of reducing the energy demand by the stadium 102. Cascading the solar hoods 236, configuring a plurality of openings 258 between the solar hoods 236, and positioning the plurality of openings 258 either North or South passively reduces the energy demand of the stadium 102 by reflecting thermal energy from the sun while allowing natural light and ventilation to permeate the outer layer 204.

The plurality of panels 230 includes a first side 238 and a second, opposing side 240, wherein the first side 238 is connected to the second side 256 of the curved secondary frame 232. The second side 240 of the plurality of panels 230 faces the atmosphere and may be made of aluminum having a natural anodized finish. The second side 240 may be adhered to a core of rigid, dense thermal insulation. The first side 238 may have a uniformly colored finish, that may be made of aluminum or alternatively a boarding material such as plywood. The arrangement of the plurality of panels 230, i.e., the solar hoods 236, on the outer layer 204 of both the fixed half dome 130 and the rotatable half dome 132 creates a stiff construction or diaphragm that resists the spreading of the fixed and rotatable half domes 130, 132. Spreading is the tendency of the dome to flatten.

The plurality of panels 230 may have a U-value of 1.15 W/(m²K) and a solar reflectance index (SRI) equal or greater than 78 for a minimum of 75% of the moveable roofing system 114. Thus, the solar hoods 236 may cover at least 75 percent of the outer layer 204.

Referring now primarily to FIGS. 12-13 and 15-21, a curtain system 300 is presented. The curtain system 300 may be included as part of the circular façade 136 of the stadium 102. The curtain system 300 may be one aspect of the overall stadium 102 design that contributes to a passive reduction of energy usage. The curtain system 300 may be used alone or in combination with other elements of the stadium 102 to passively reduce energy demand.

Figure 15:
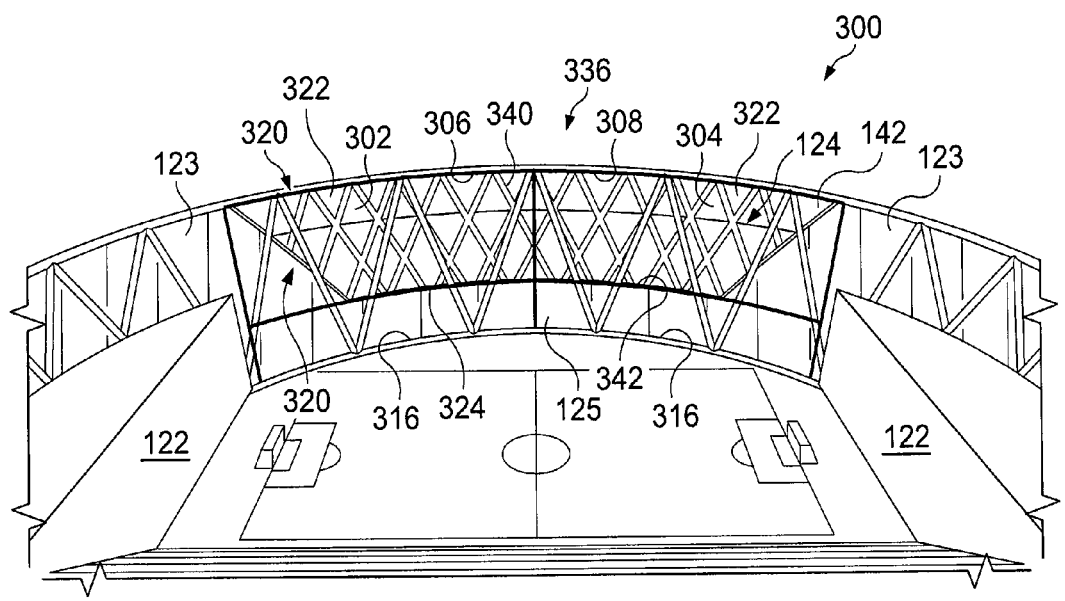
FIG. 15 illustrates one embodiment of a curtain system in a closed position.
Figure 16:
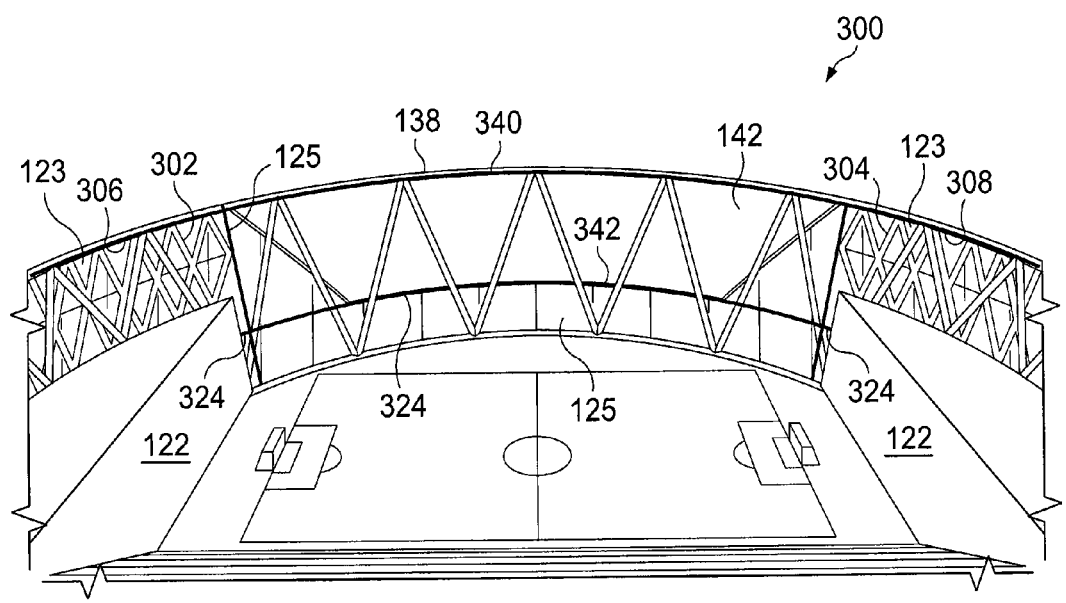
FIG. 16 illustrates the curtain system of FIG. 15 in an open position.
Figure 17:
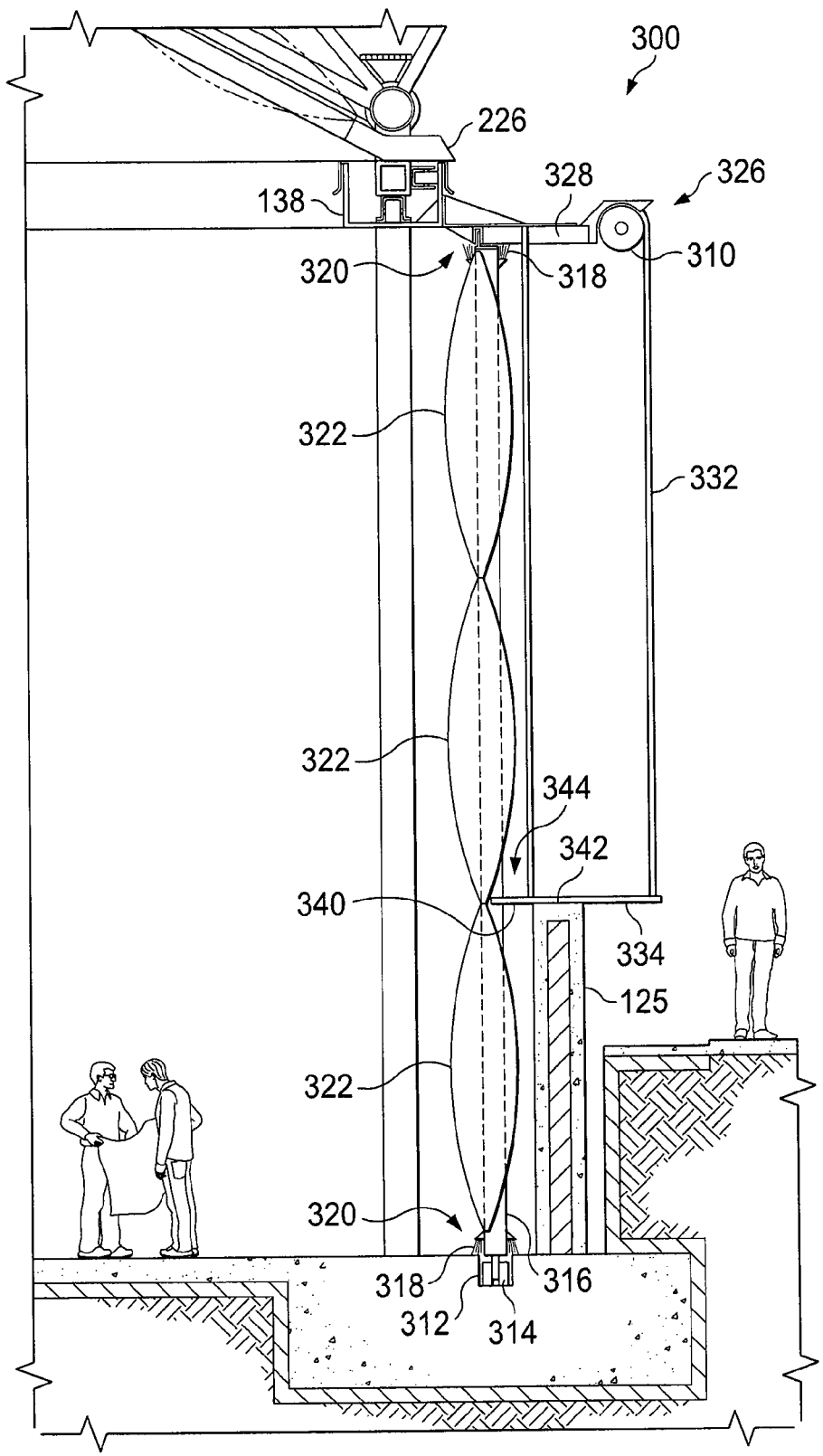
FIG. 17 illustrates a cross-sectional view of the wheel mechanism and a curtain system.
Figure 20:
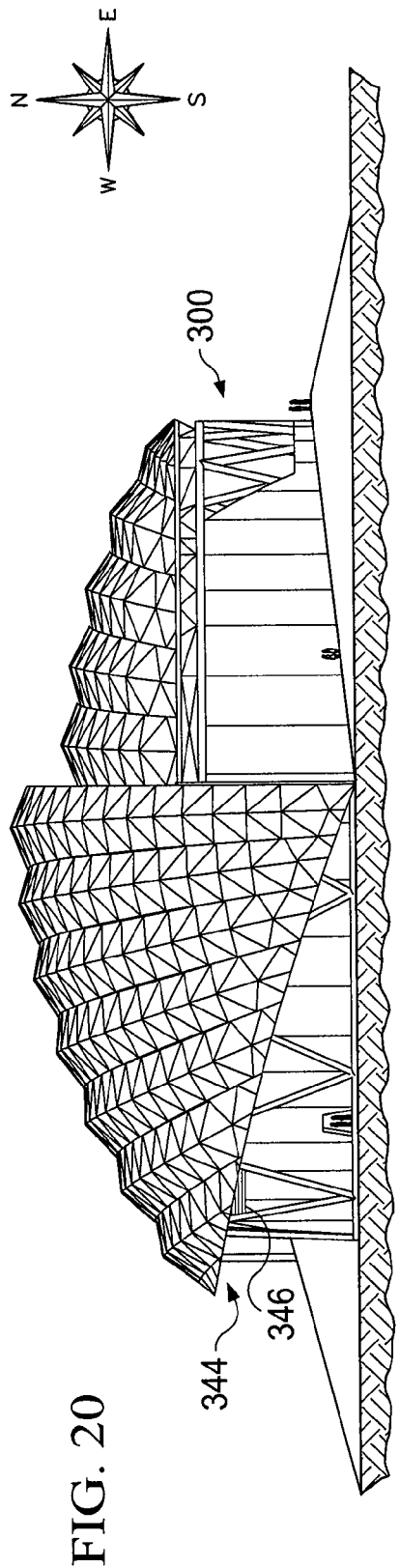
FIG. 20 illustrates one embodiment of a South elevation, side view of the stadium of FIG. 2.
Figure 21:
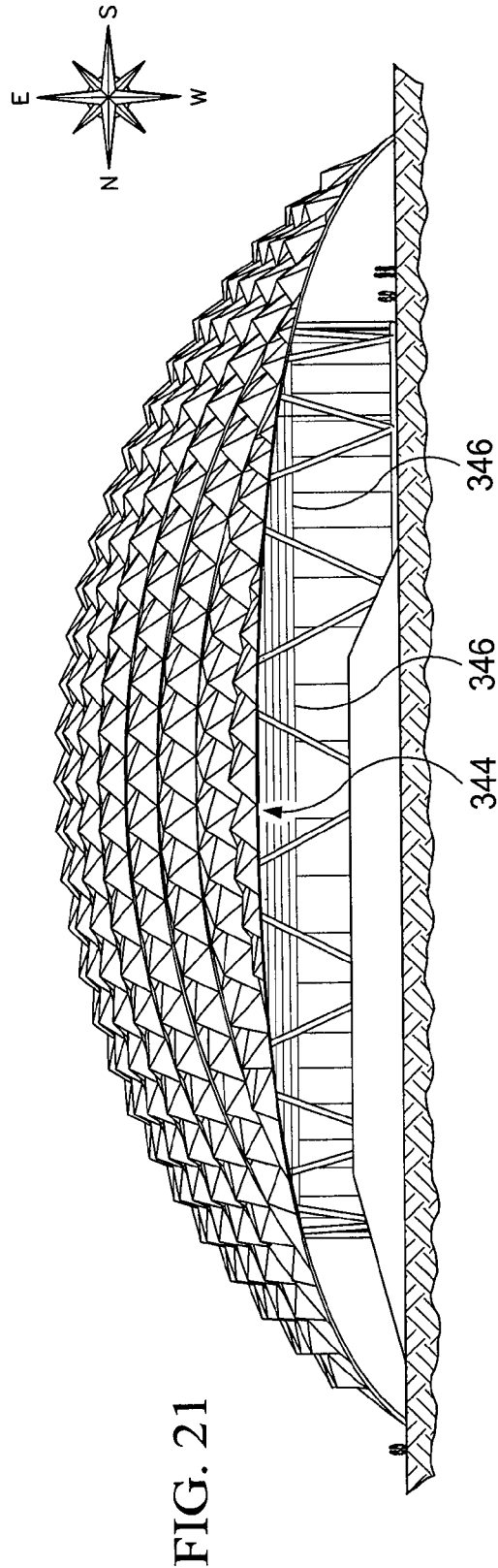
FIG. 21 illustrates one embodiment of a West elevation, side view of the stadium of FIG. 2.

The curtain system 300 may include a first vertical screen 302 and a second vertical screen 304 slidingly positioned along the circular façade 136. The first vertical screen 302 may move in a direction opposing the second vertical screen 304 such that the curtain system 300 parts as the first and second vertical screens 302, 304 move away from each other. The first and second vertical screens 302, 304 may form a part of the Eastern side of the circular façade 136 such the first and second screens 302, 304 cover the opening 142 opposite the seating tribune 128 when the curtain system 300 is in a closed position 336 as seen in FIG. 15. The first and second vertical screens 302, 304 are mounted on a first and second frame 306, 308, respectively. The first and second frames 306, 308 may be constructed of steel and may span from the ground, e.g., approximately pitch 118 level, to the second roof support 138. The frames 306, 308 may have both vertical and triangulated mullions. The frames 306, 308 support the first and second screen 302, 304 to form two sliding screens which retract behind the adjacent wall panels 122. In one embodiment there may be as single vertical screen that slides behind the plurality of wall panels 122 instead of two vertical screens. The screens may be constructed out of an ETFE material.

The screens 302, 304 may have a top hung roller assembly 310 fixed to the second roof support 138 and a flush rebated track channel 312 in the floor accommodating roller guides 314 fixed to a screen base 316. The screens 302, 304 may have sealing members 318 such as brush seals along the screen edges and interfaces 320 to mitigate air leakage from the stadium 102.

A plurality of triangulated ETFE pillows 322 may be fixed to the frames 306, 308 of the screen 302, 304. The screens 302, 304 may have handles (not shown) to facilitate safe operations and locking mechanisms (not shown) for stadium security when the screens are in the closed position.

The screens 302, 304 will have a portion 324 level with a parapet 342 of a plurality of dwarf wall panels 125. An interface 344 will be formed by a secondary frame 340 and may be an insulated aluminum flashing. The secondary frame 340 will provide an additional restraint rail for the sliding screens 302, 306. The insulated flashing will help maintain the integrity of thermal performance to the stadium 102 while in the closed position by inhibiting thermal gains to the outer face of the plurality of wall panels 122 and further inhibit the ingress of sand and debris into the sliding screen floor tracks 312. The insulated flashing will form vertical returns at either side of the wall panel opening 142 and will terminate against the underside of the sliding assembly.

A plurality of roller blind mechanisms 326 may be fixed via cantilever steel brackets 328 to the second roof support 138. The blind mechanism 326 will be constructed for outdoor use and will provide solar protection to the ETFE screens 302, 304. The blind mechanism 326 may be made of an external weather grade blind fabric 332. The blind mechanism 326 may include vertical guide wires 330 at sufficient intervals to adequately tension the blind fabric 332 under normal operating conditions. The blind mechanism 326 may further include cantilevered base brackets 334 fixed to the parapet 342 of the plurality of dwarf wall panels 125 to provide restraint and support to the blind mechanism 326.

As will be discussed in more detail below with regard to the cooling system, the plurality of wall panels 122 may include a plurality of openings 344 to accommodate vertical banks of moveable, horizontal louvers 346. The louvers 346 may be comprised of aluminum and located on the West side of the circular façade 136. The louvers 346 may include motorized actuators (not shown) connected to the building management system (BMS) which will be discussed in more detail below with reference to at least FIG. 33. When the louvers 346 on the West side of the circular façade 136 and the sliding screens 302, 304 on the opposing East side of the circular façade 136 are in an open position, a natural cross ventilation may be provided to the interior 134 of the stadium 102.

Referring now primarily to FIGS. 22A-25, with further reference to the stadium 102 as described in FIGS. 1-21, a microclimate cooling system 400 is presented. The microclimate cooling system 400 may be used in an indoor/outdoor stadium such as stadium 102 illustrated in FIG. 1. The microclimate cooling system 400 may be used alone or in combination with elements disclosed herein, to passively reduce the energy demands of a stadium 102.

Figure 2:
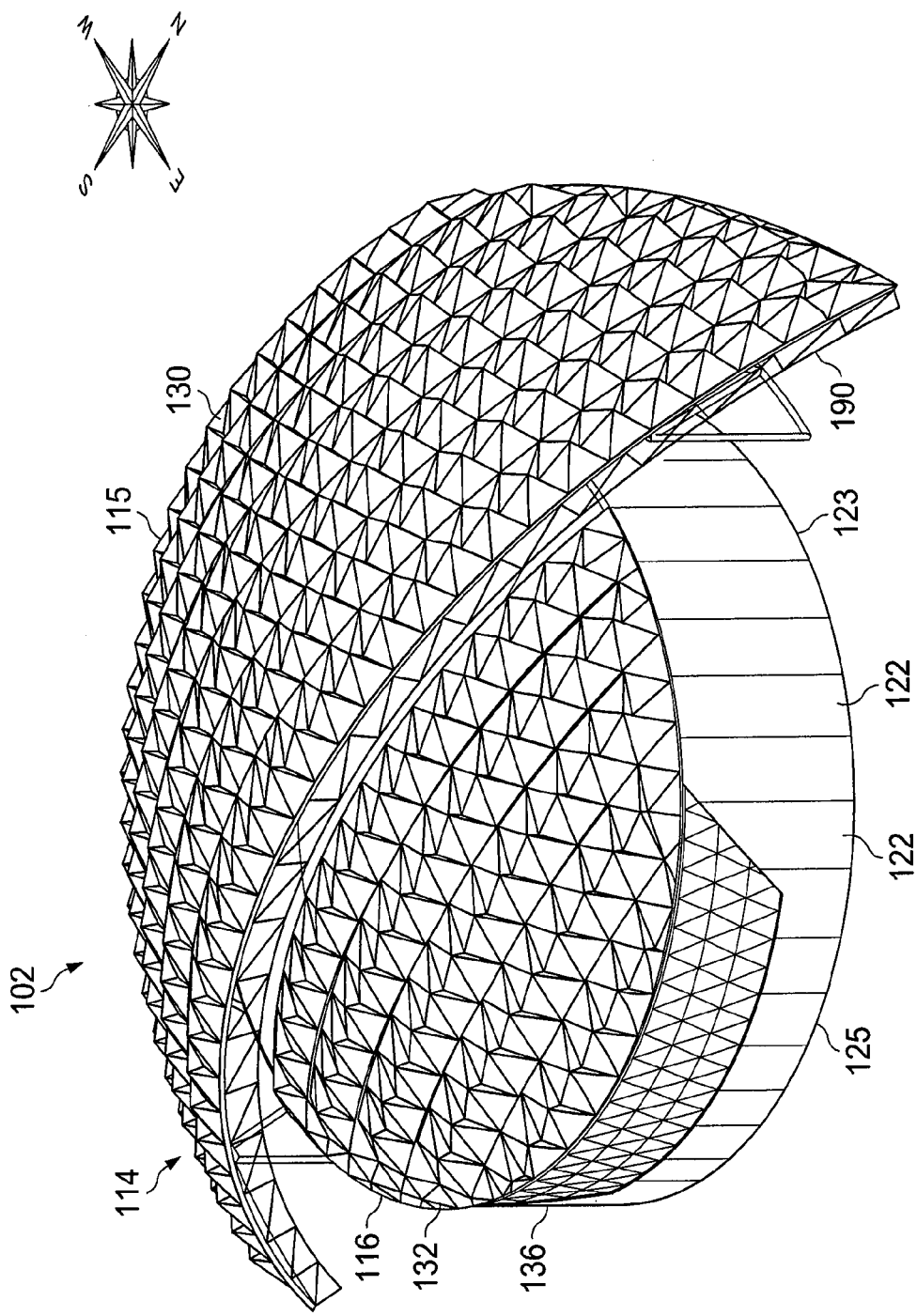
FIG. 2 illustrates a perspective view of a stadium of the zero carbon stadium infrastructure of FIG. 1.
Figure 3:
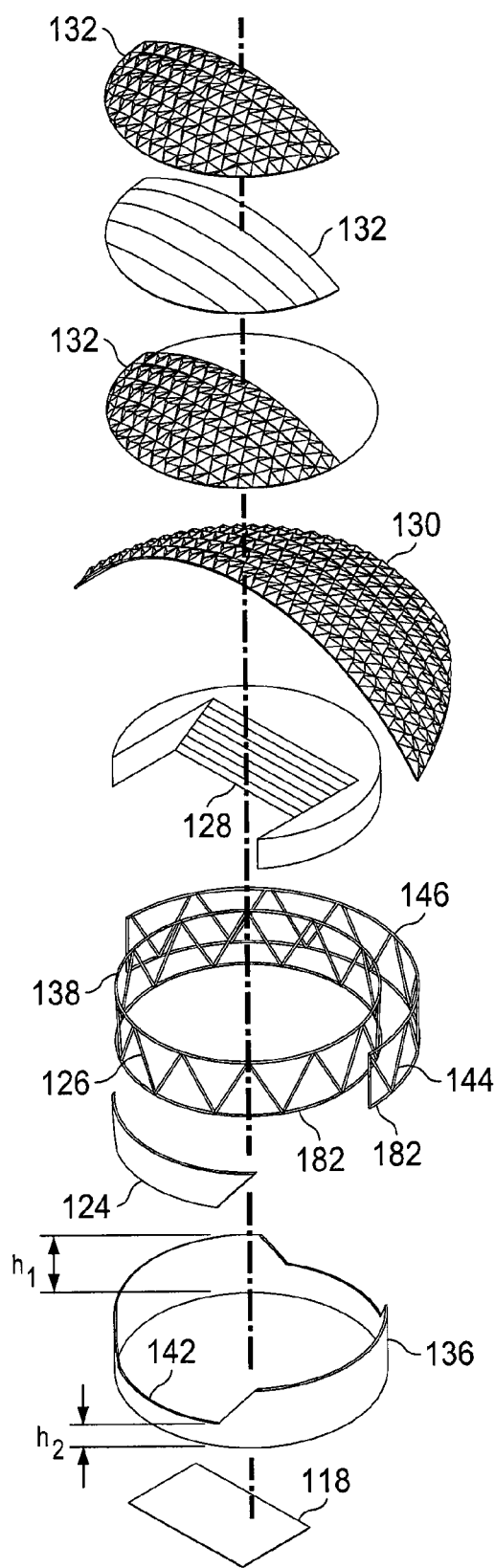
FIG. 3 illustrates a partial exploded view of the stadium of FIG. 2.
Figure 4:
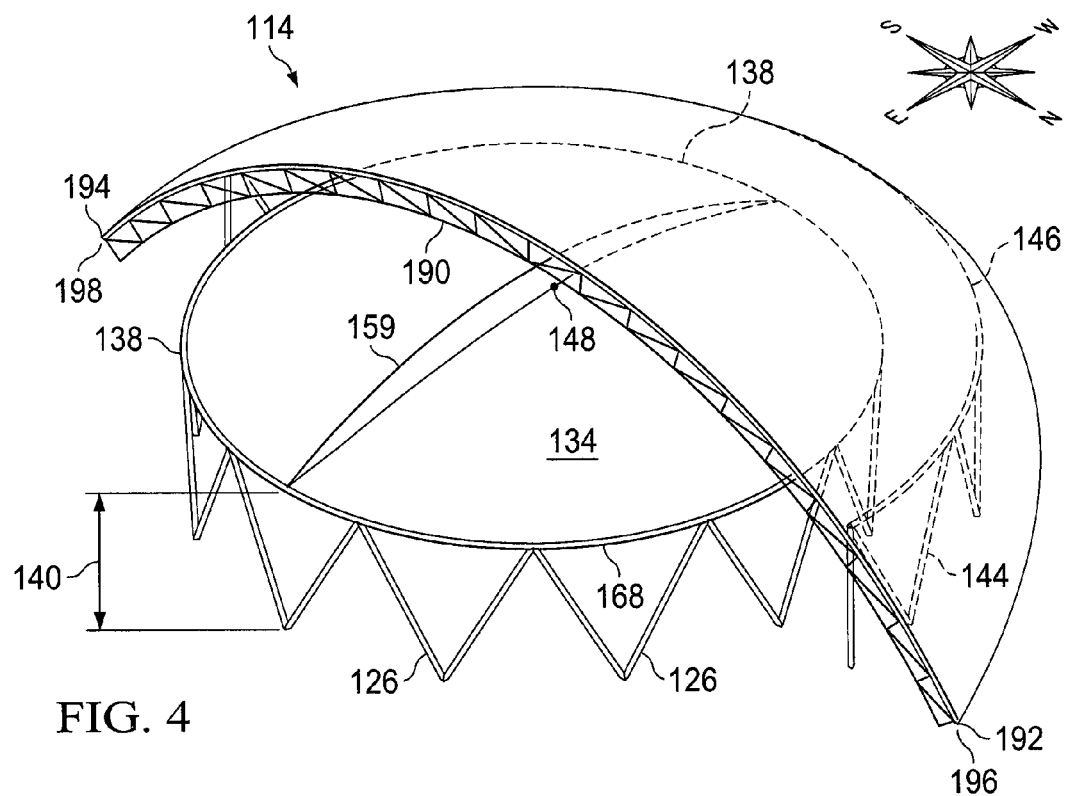
FIG. 4 illustrates a schematic diagram of the stadium of FIG. 2.
Figure 5:
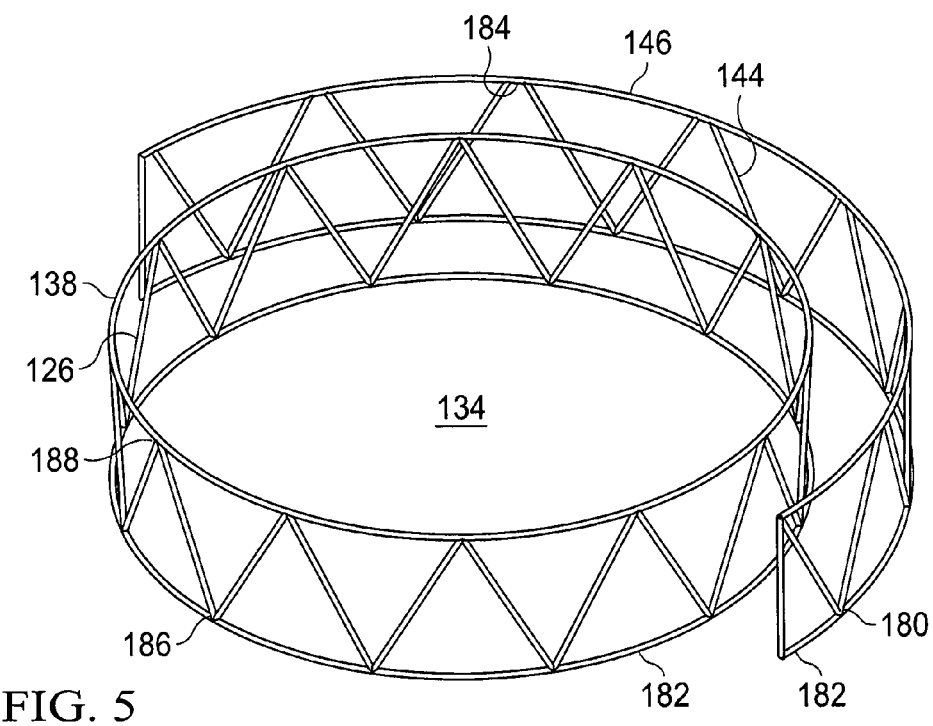
FIG. 5 illustrates a schematic diagram of the stadium of FIG. 2.
Figure 6:
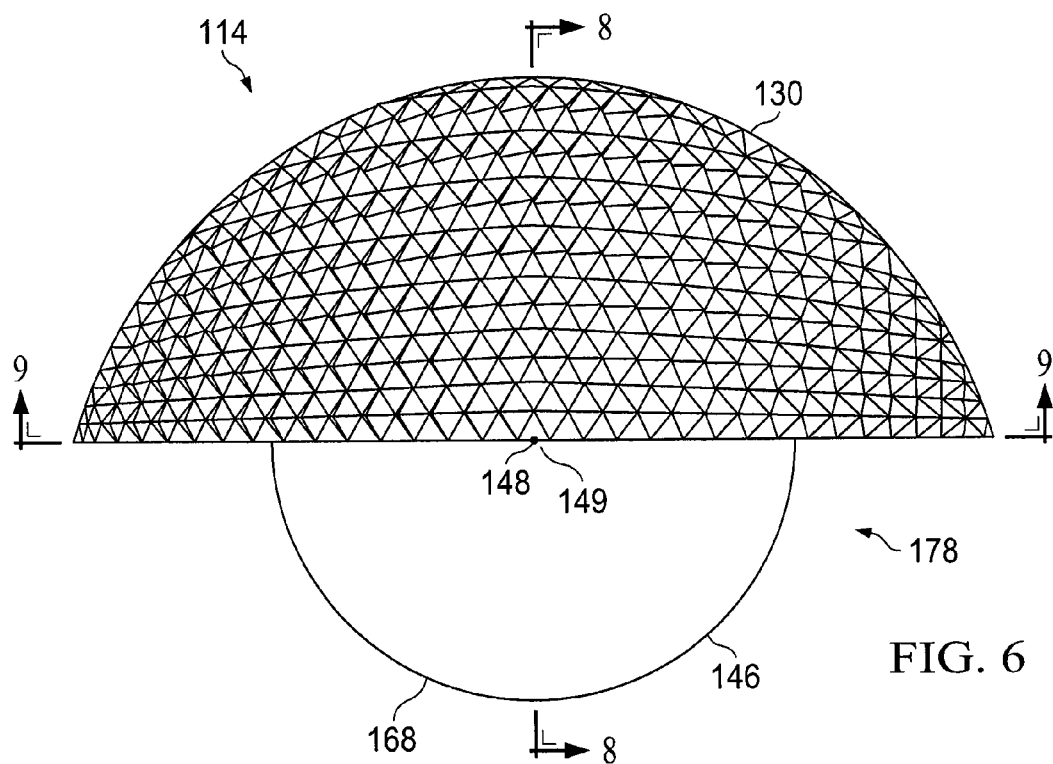
FIG. 6 illustrates a plan view of the stadium of FIG. 2 in an open position.
Figure 7:
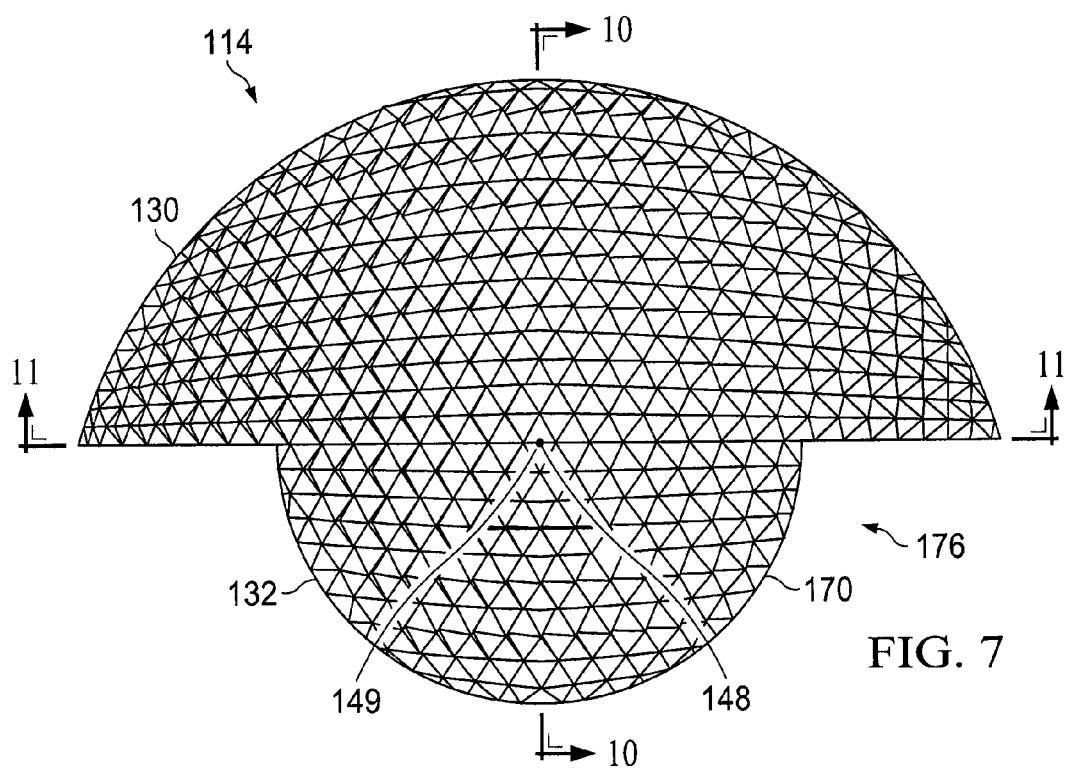
FIG. 7 illustrates a plan view of the stadium of FIG. 2 in a closed position.
Figure 10:
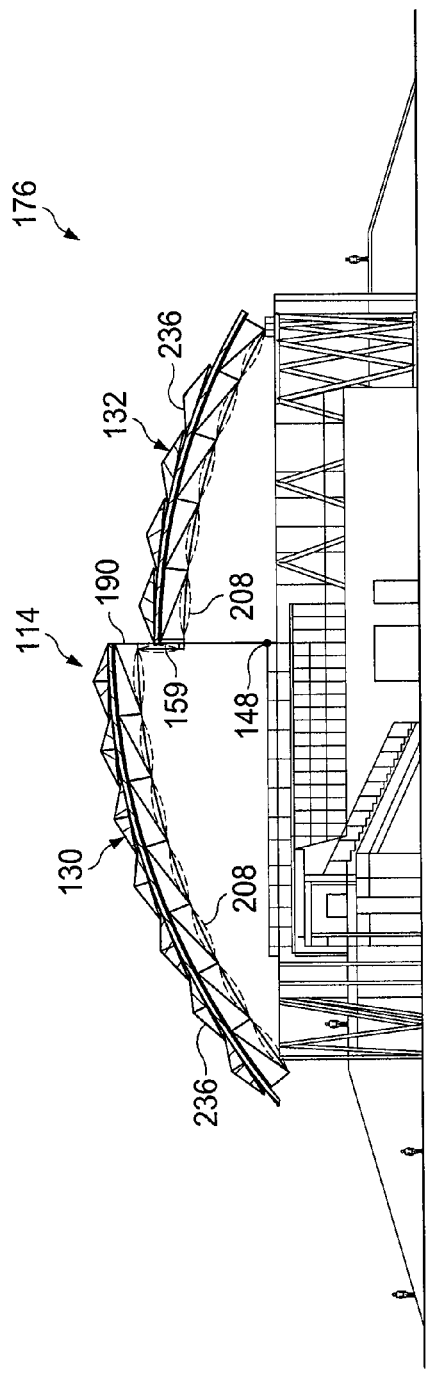
FIG. 10 illustrates a cross-sectional side view of the stadium of FIG. 7 taken along line 10-10.
Figure 8:
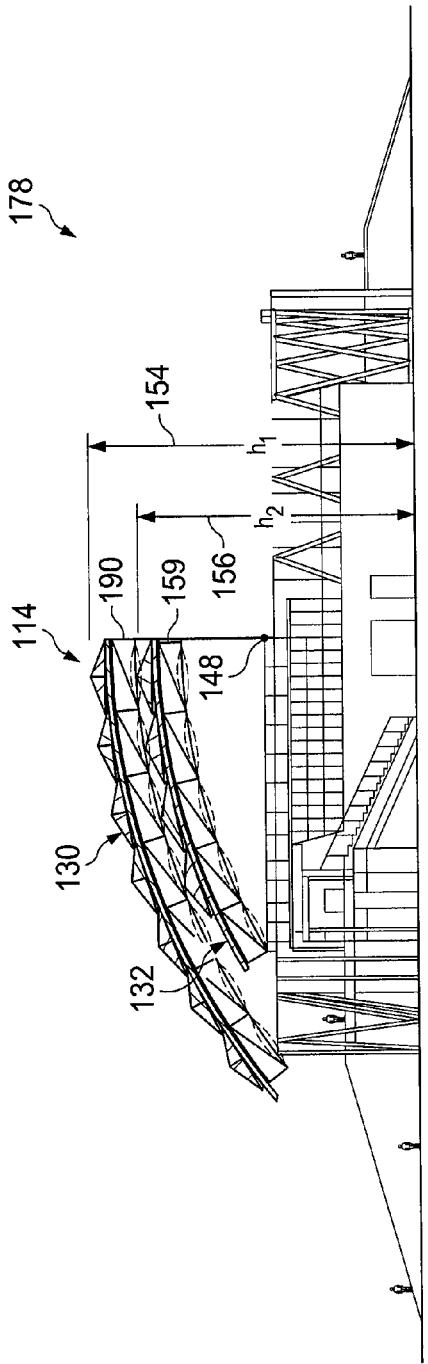
FIG. 8 illustrates a cross-sectional side view of the stadium of FIG. 6 taken along line 8-8.
Figure 11:
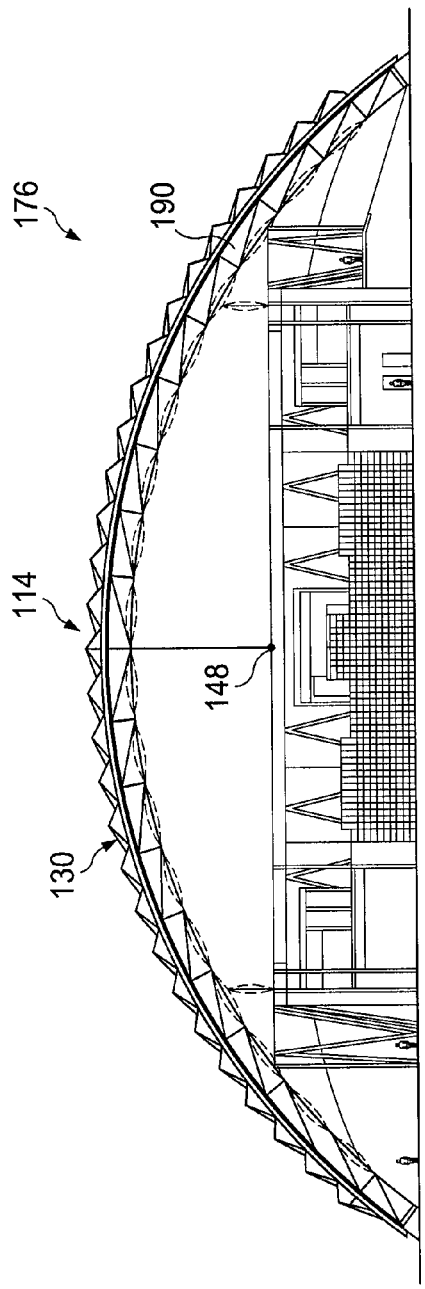
FIG. 11 illustrates a cross-sectional side view of the stadium of FIG. 7 taken along line 11-11.
Figure 9:
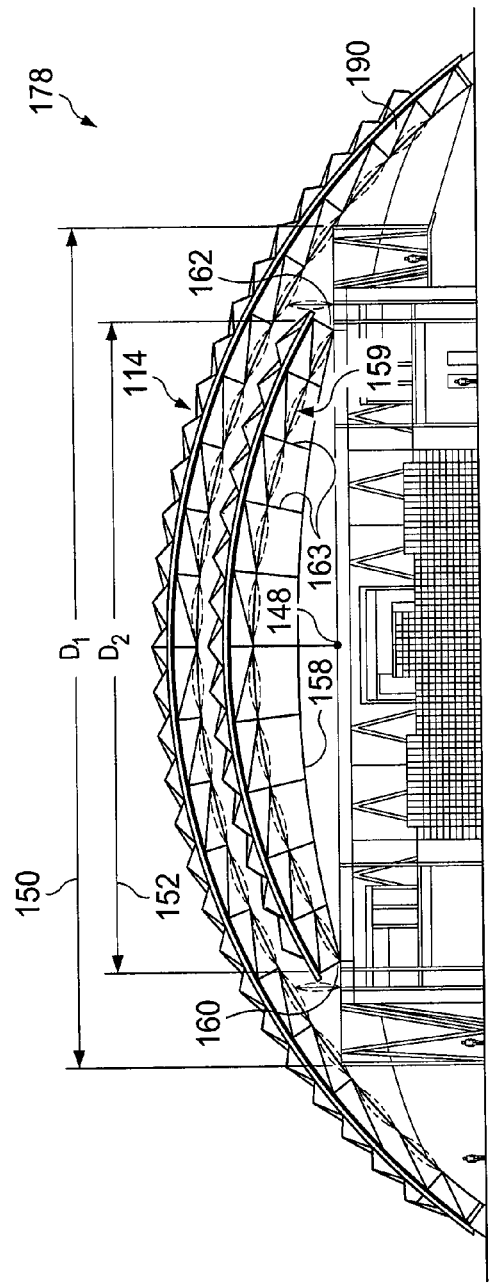
FIG. 9 illustrates a cross-sectional side view of the stadium of FIG. 6 taken along line 9-9.

The microclimate cooling system 400 may include a partially rotatable roof such as the moveable roofing system 114 of FIG. 2 having the closed position 176 for environmentally sealing the interior 134 of the stadium 102 and a open position 178 that exposes a portion of the interior 134 to the atmosphere 430. The microclimate cooling system 400 may further include the pitch 118, the seating tribune 128, a raised concrete barrier 434, a first wall 436, a second wall 438, and a plurality of air handling units 406. The pitch 118 has a length L1 and the seating tribune 128 may extend approximately the length L1 of the pitch 118. The seating tribune 128 is positioned adjacent a first side 432 of the pitch 118. The raised concrete barrier 434 is adjacent a second side 440 of the pitch 118 opposing the first side 432 of the pitch 118. The first wall 436 is positioned adjacent a third side 442 of the pitch 118 such that the first wall 436 is perpendicular to the seating tribune 128 and extends between at least a portion of the seating tribune 128 and the raised concrete barrier 434. The second wall 438 is positioned adjacent a fourth side 444 of the pitch 118 such that the second wall 438 is perpendicular to the seating tribune 128 and extends between at least a portion of the seating tribune 128 and the raised concrete barrier 434. The plurality of air handling units 406 are located beneath the seating tribune 128 and supply cooling air 446 to the seating tribune 128. The first wall 436 and the second wall 438 funnel the cooling air 446 so that the cooling air 446 flows from the seating tribune 128 down to the pitch 118 creating a cooled microclimate around the seating tribune 128 and the pitch 118. The microclimate cooling system 400 may create a cooled microclimate around the seating tribune 128 and the pitch 118 by downward air movement illustrated by the cooling air arrows 446. As can be seen in at least FIGS. 22A-22C and FIG. 25, the cooling air 446 flows from the seating tribune 128 down to the pitch 118. The raised concrete barrier 434 opposing the first side 432 of the pitch 118 will pose as a barrier to cooling air 446. The concrete barrier 434 keeps the cooling air 446 flowing down from the seating tribune 128 and across the pitch 118 from freely flowing out of the stadium 102. The raised concrete barrier 434 may be part of the circular façade 136. Moreover, the raised concrete barrier 434 may be comprised of the plurality of dwarf wall panels 125.

The stadium microclimate cooling system 400 may further include an under-tier plenum 404, an air handling plant 402, and ventilation outlets 414. The microclimate cooling system 400 will supply cooled air 446 from the plurality of air handling units 406 associated with the air handling plant 402 to the under-tier plenum 404. The under-tier plenum 404 will distribute the cooled air 446 to the seating tribune 128 via the ventilation outlets 414 located in a plurality of stadium risers 418. A plurality of supplementary supply outlets 416 flanking the pitch 118 may be further included as part of the microclimate cooling system 400 to create air circulation.

The seating tribune 128 may further include the plurality of stadium risers 418 vertically separating a plurality of seating tiers or walkways 452, each of the seating tiers 452 having a plurality of seats 448. The plurality of seats 448 may include a plurality of multi-dimensional perforations 450 to facilitate air flow 470. The plurality of ventilation outlets 414 may be formed within the stadium risers 418 to deliver the cooling air 446 to the seating tribune 128. A diffuser 422 may be positioned over each ventilation outlet 414. The diffusers 422 distribute the cooling air 446 to the plurality of seats 448.

The ventilation outlets 414 may further deliver cooled air 446 from the under-tier plenum 404 to the ankle zone 454 of the seat 448 immediately above the ventilation outlet 414 and to the neck/back zone 456 of the seat 448 in the next forward row. The seats 448 will have multi-dimensional perforations 450 to facilitate the air flow 470 of the cooled air 446 to the spectator. The seats 448 include a seat portion 458 and a backrest portion 460. Both the seat portion 458 and the backrest portion 460 may include the multi-dimensional perforations 450. The perforations 450 may be designed such that the perforations 450 promote the continuation of the cooling air 446 cascading effect when the seat 448 is not in use. The seat 448 may have an overall height h2 from the walkway 452 to the top of the backrest portion 460 of 900 mm. The height h1 of the seat 448 above the walkway 452 may be a maximum of 450 mm and a minimum is 435 mm.

Figure 22A:
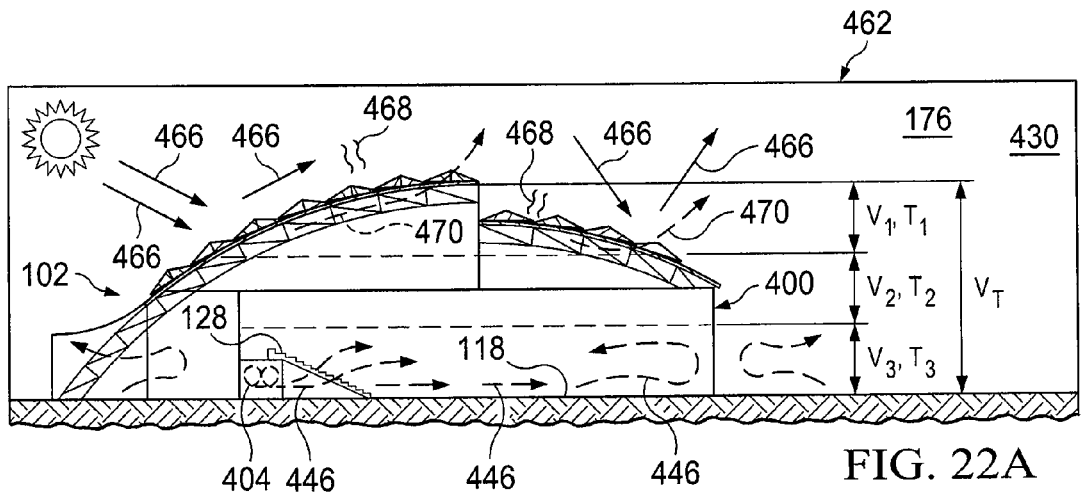
FIG. 22A illustrates a schematic diagram of a microclimate cooling system.
Figure 22B:
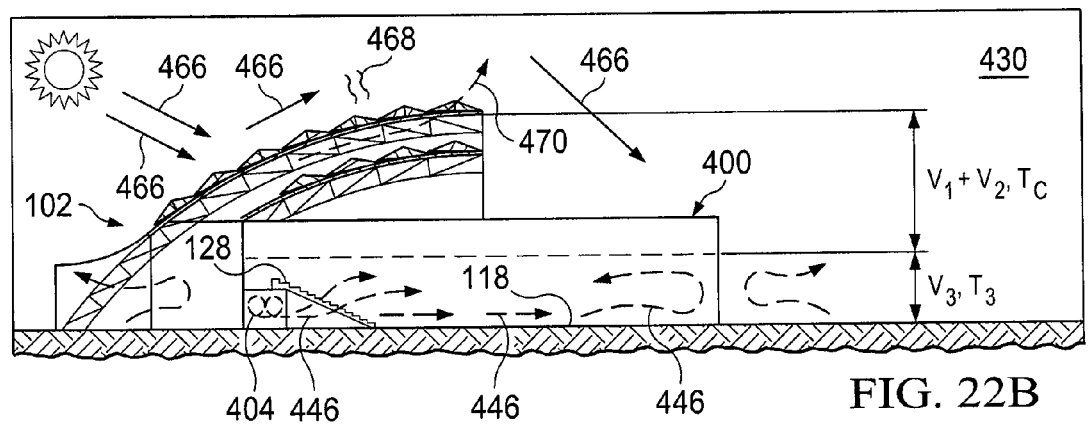
FIG. 22B illustrates another schematic diagram of a microclimate cooling system.

Referring specifically to FIGS. 22A-22B, but still with reference to FIGS. 1-25, the stadium 102 and the microclimate cooling system 400 is presented under various conditions. FIG. 22A illustrates the stadium 102 in the closed position 176 receiving and reflecting solar radiation 466 from the sun. When in the closed position 176, the microclimate cooling system 400 may run in a full circulation mode 462 for cooling a total volume Vt. The microclimate cooling system 400 may distribute air in the full circulation mode 462 to a plurality of air handling units in addition to the air handling units that focus on the seating tribune 128 and the pitch 118. Heat 468 is reflected off the stadium 102. Air flow 470 moves through the moveable roofing system 114 to help dissipate heat build up in the roof. Cooling air 446 is delivered to the stadium tribune 128 and the pitch 118. As illustrated, the plurality of dwarf wall panels 125 block the cooling air 446 from exiting the stadium 102 and rebounds the cooling air 446 back into the stadium 102. For illustrative purposes, FIG. 22A shows a total volume Vt of the stadium 102 broken into three different volumes. The three different volumes are a first volume V1, a second volume V2, and a third volume V3. The first volume V1 is the top volume of the stadium 102 and is associated with a first temperature zone T1. The second volume V2 is the intermediate volume of the stadium 102 and is associated with a second temperature zone T2. The third volume V3, is the lower volume and includes the portion of the stadium 102 having the seating tribune 128 and the pitch 118. The third volume V3 is associated with a third temperature zone T3. The different volumes V1, V2, and V3 generally show the three main temperature zones T1, T2, and T3, respectively. The third temperature T3 is cooler than both the first and second temperature zones T1 and T2 because the microclimate cooling system 400 efficiently cools the first volume without too much loss of cooling to the upper volumes, the first and second volumes V1 and V2. The second temperature T2 is warmer than the first temperature zone T1 but cooler than the third temperature zone T3. While the microclimate circulation mode 464 may cool the entire stadium 102, the may still be temperature variations as the heat will rise to the top of the stadium 102. Warm air has an air density greater than cool air, thus the warm air may help maintain the cooling air 446 around the seating tribune 128 and the pitch 118.

FIG. 22B is similar to FIG. 22A except FIG. 22B illustrates the stadium 102 in the open position 178. In this embodiment, the first and second volumes V1 and V2 are combined having a combined temperature Tc greater than the third temperature T3. The third temperature zone T3 is still cooler than the combined temperature Tc. FIG. 22B illustrates that the microclimate cooling system 400 may maintain a focused cooling to the seating tribune 128 and the pitch 118. In the open position 178, the microclimate cooling system 400 may run in a microclimate mode 464 that focus the cooled air 446 to areas where spectators and players will be such as the seating tribune 128 and the pitch 118.

Figure 22C:
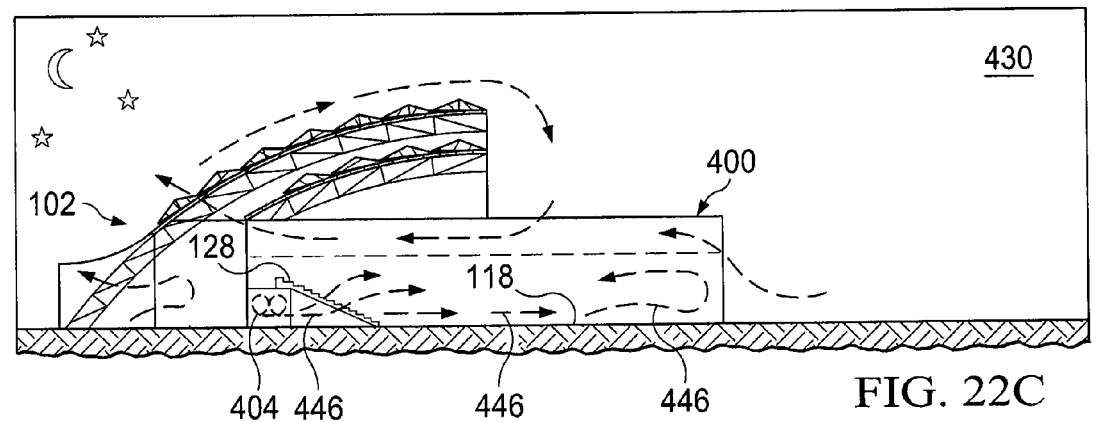
FIG. 22C illustrates another schematic diagram of a microclimate cooling system.

FIG. 22C illustrates the stadium 102 in the open position 178 during the evening when the sun has either set or is in a position that dissipates less solar radiation. There may not be much variation in temperature from the top volume of the stadium 102 to the bottom volume of the stadium 102 do to cool night air mingling with the cooling air 446.

The under-tier plenum 404 may include a plurality of concrete units (not shown) enclosing the plenum 404, steel rakers (not shown) for supporting the plenum 404, and a soffit cladding system 426 for insulating the plenum 404. The air handling plant 402 will include appropriate air return and supply ducts 410, 412, respectively. The plurality of ventilation outlets 414 will be positioned adjacent the seating tribune 128 and may further be placed in other areas of the stadium 102. The plurality of ventilation outlets 414 may include supplementary outlets 416 adjacent the pitch 118. The stadium 102 will provide thermal insulation by way of external facades such as the circular facade 136 and a roofing system such as the moveable roofing system 114. The circular façade 136, the seating tribune 128, and other elements of stadium 102 may be made from concrete having a thermal inertia material properties for maintaining surrounding air temperatures. The microclimate cooling system 400 does not require the interior 134 of the stadium 102 to be sealed or in a closed position 176 at all times to function. The stadium 102 is configured to provide thermal insulation and a barrier to cooling air 446 escaping the microclimate when the stadium 102 is in both an open and closed position 176, 178.

The seating tribune 128 may be made from a plurality of pre-cast concrete units (not shown) that may be supported on steel raker beams. As previously mentioned, concrete units may be used for the concretes thermal inertia value. The under-tier plenum 404 will be constructed to the underside of the seating tribune 128 and the plenum cladding 426 will be hung from a structural soffit. The steel rakers will be enclosed within the plenum 404. The plurality of ventilation outlets 414 will be formed within the concrete tribune units along the stadium risers 418. The diffuser 422 may cover the entire ventilation outlet 414 to distribute the cooled air 446.

As previously stated, the plenum 404 will include cladding 426. The cladding is constructed to help create a substantially sealed area within the plenum 404 such that the plenum 404 may be able to resist the passage of air. The plenum 404 may be constructed such that the air leakage rates will be better than 0.6 liters/sec/m$^2$ against a pressure of +25 Pa. The soffit cladding system 426 may be a metal insulated composite panel comprising two steel facings bonded to high density mineral wool core panels.

Outside air to the air handling unit 402 will be supplied via duct connections to the ground floor external air supply plenum 410 on the west façade. The air handling unit 402 will supply cooled air 446 to the under-tier plenum 404 by multiple duct connections in the plenum soffit cladding panels. The air handling supply unit 402 will also provide a supplementary cooled air 446 supply to the playing area 118 via supplementary outlets 416 in the pitch-end flank walls or the first and second walls 436, 438. Heat exchangers 428 will recover residual cooling capacity from the exhaust air for re-use as supplementary supply to the under-tier plenums 404.

Figure 23:
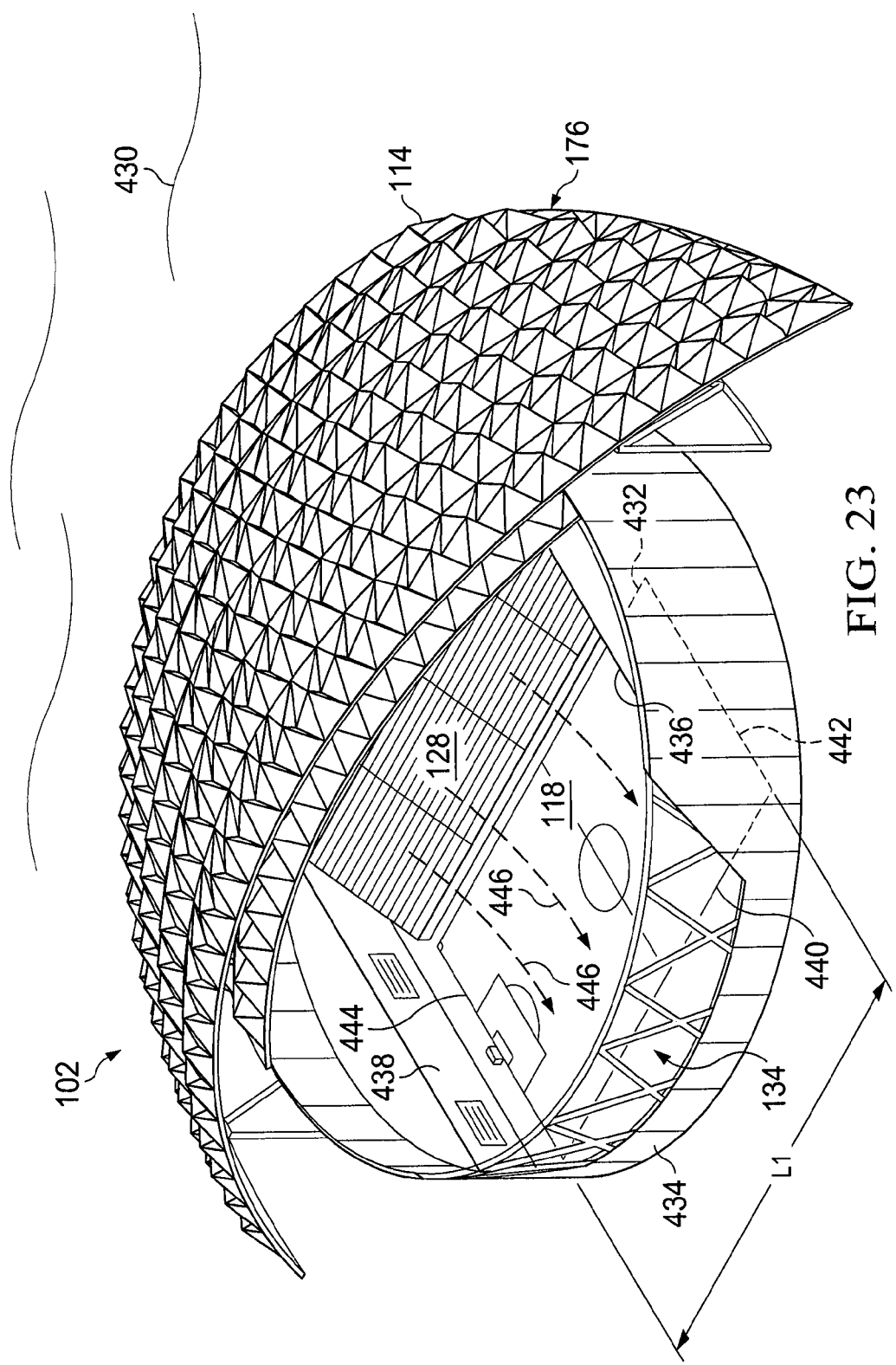
FIG. 23 illustrates a perspective view of a microclimate cooling system.
Figure 24A:
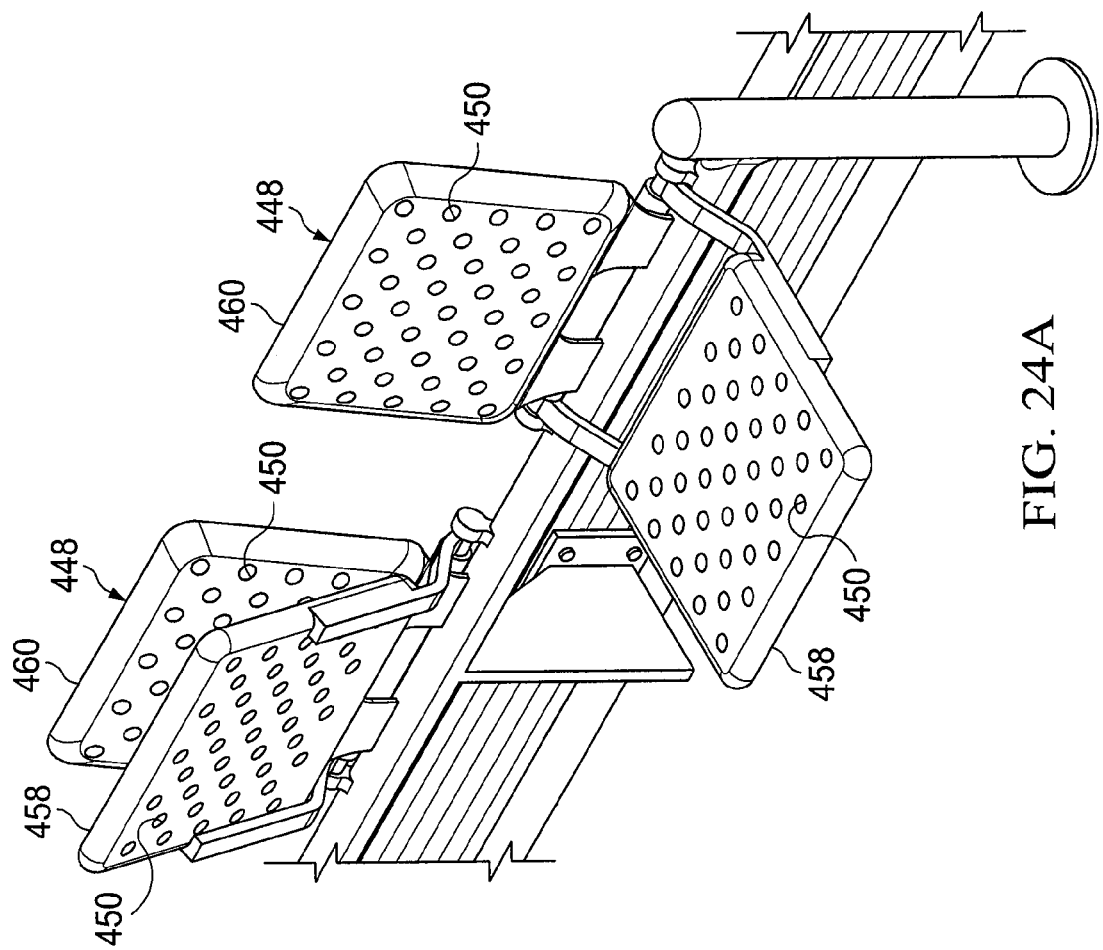
FIG. 24A illustrates a perspective view of seats.
Figure 24C:
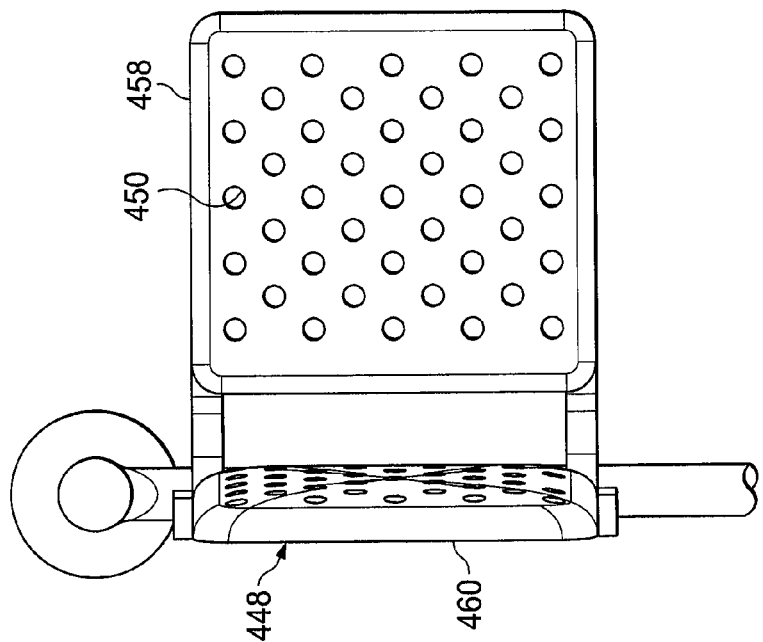
FIG. 24C illustrates a top view of the seat of FIG. 23B.
Figure 24B:
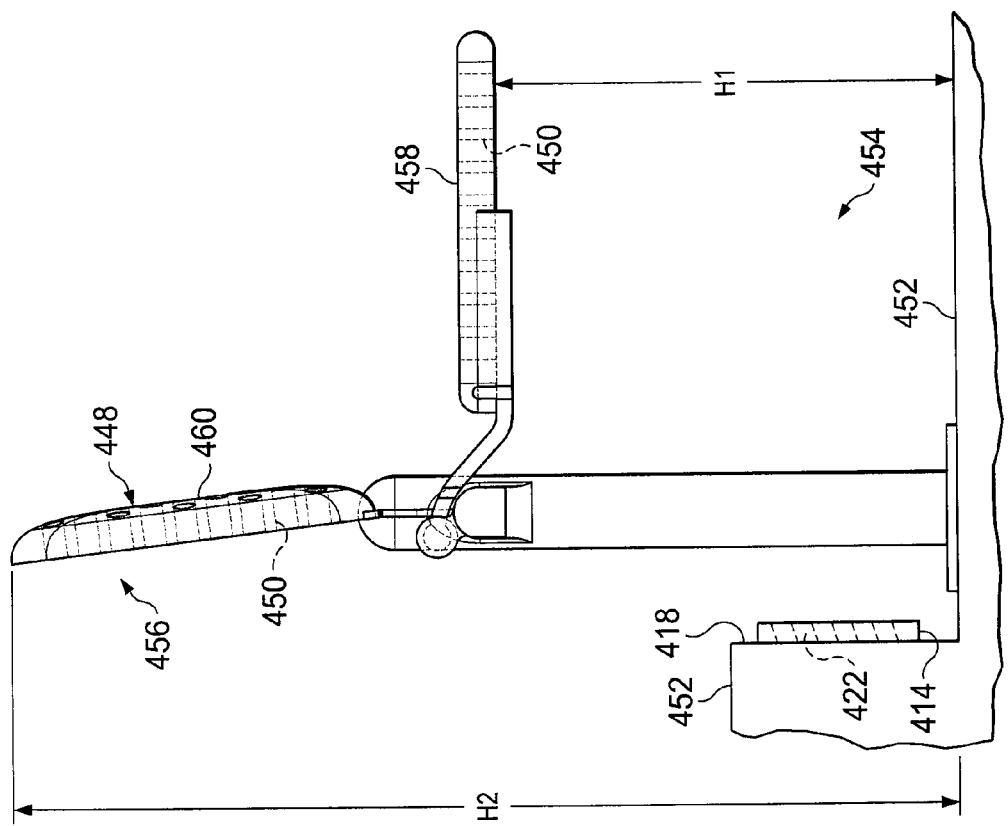
FIG. 24B illustrates a side view of one of the seats of FIG. 23A.
Figure 24D:
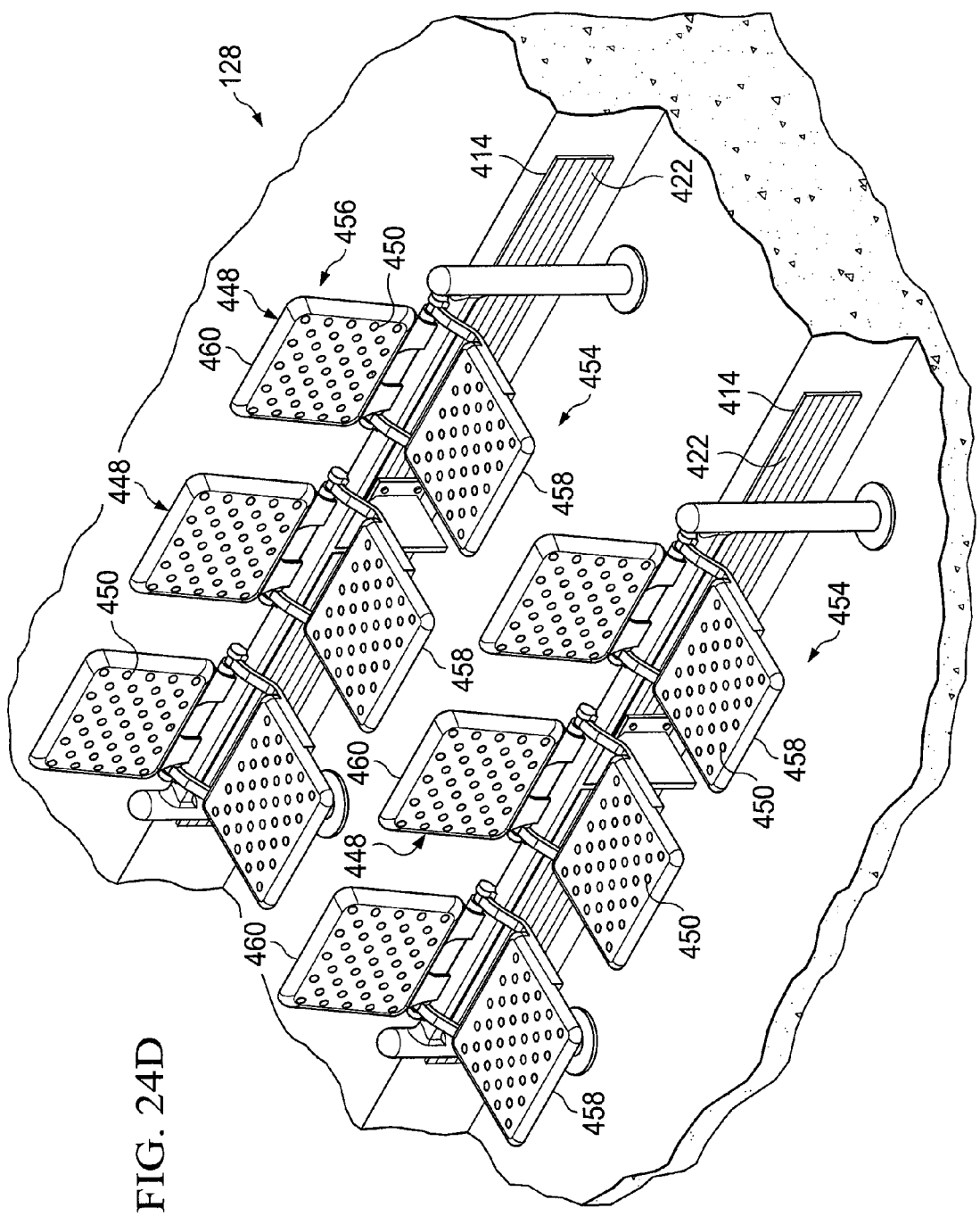
FIG. 24D illustrates a perspective view of a portion of a seating tribune.
Figure 25:
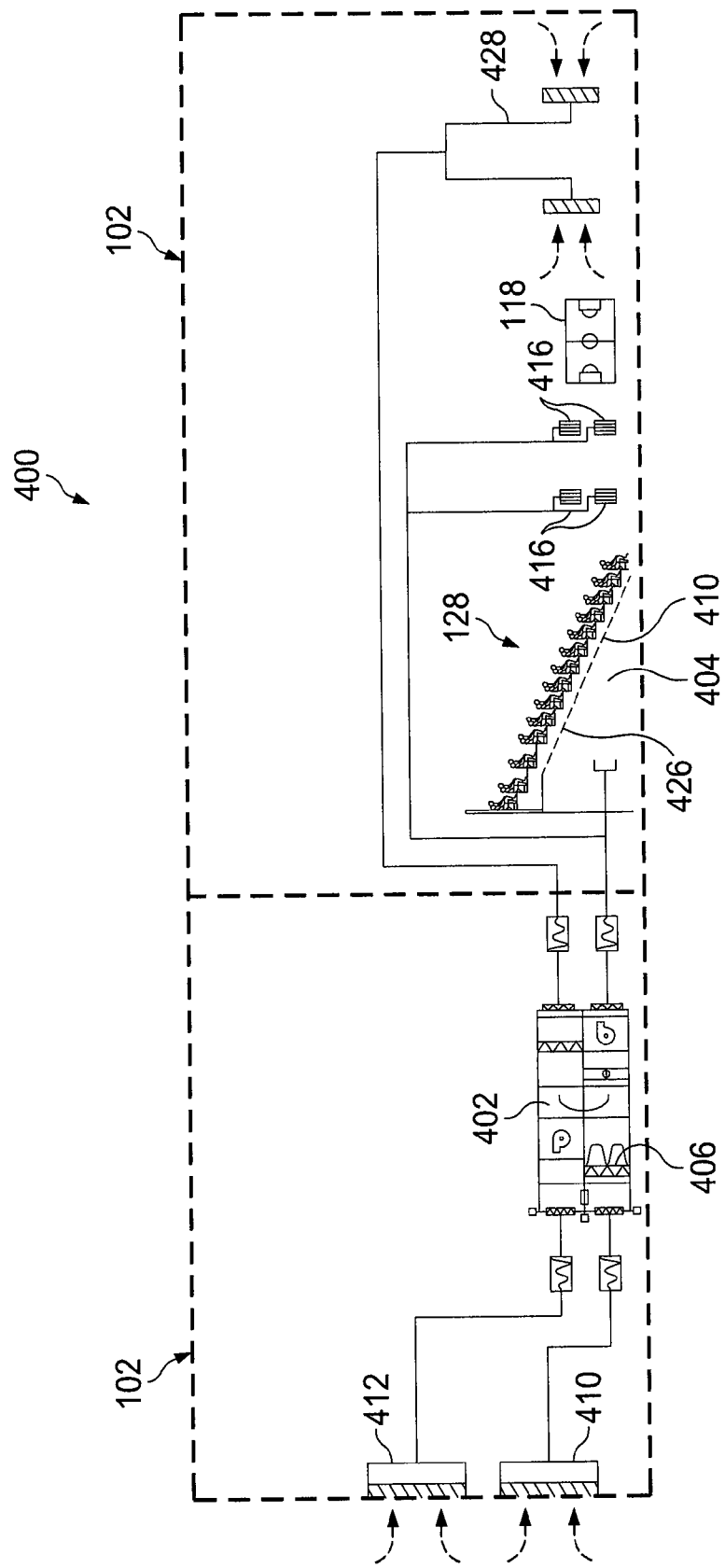
FIG. 25 illustrates one embodiment of a microclimate cooling system
Figure 26:
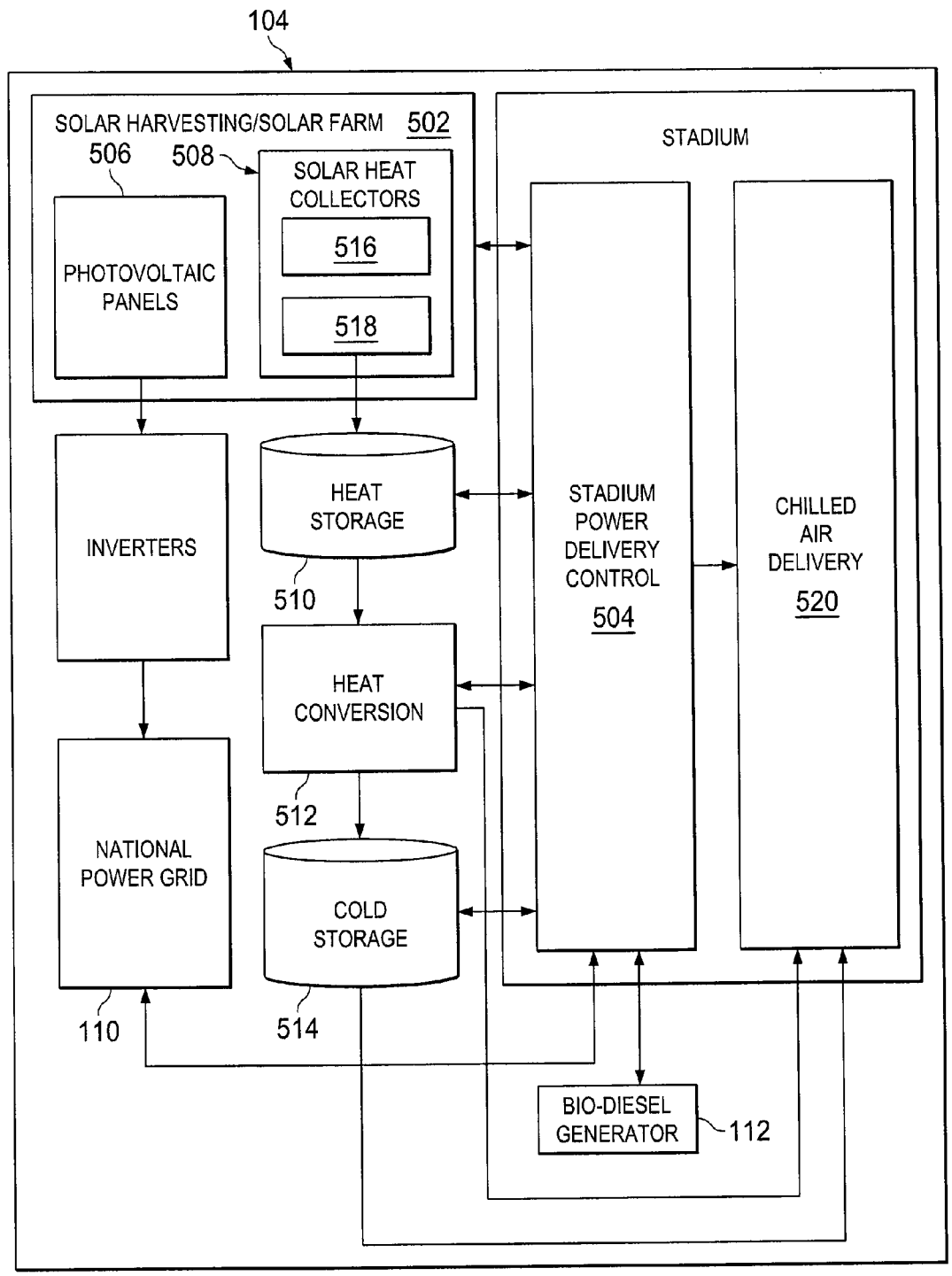
FIG. 26 illustrates a schematic diagram of one embodiment of the zero carbon infrastructure of FIG. 1.
Figure 27:
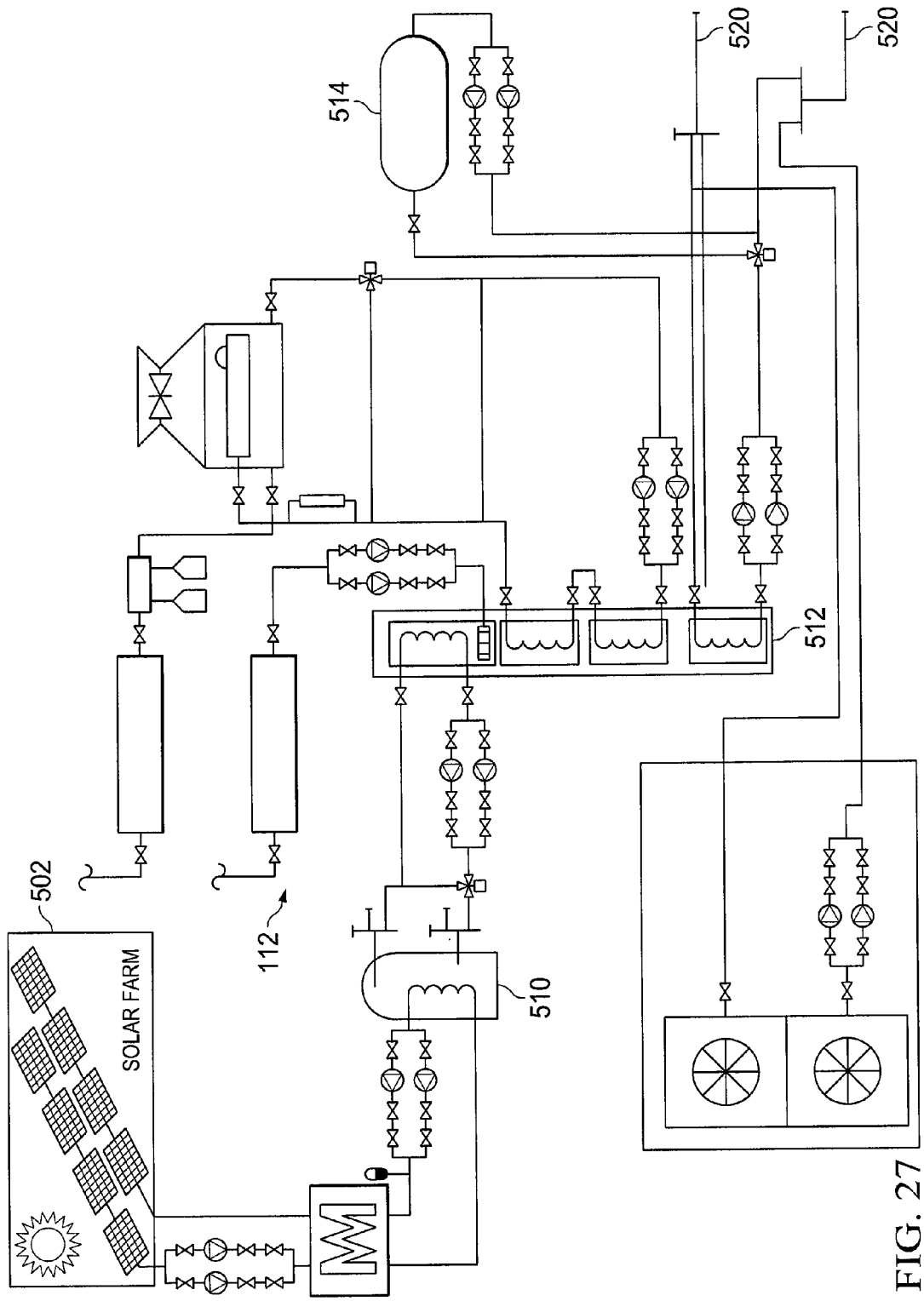
FIG. 27 illustrates a schematic diagram of one embodiment for cooling the stadium using a zero carbon infrastructure.
Figure 28:
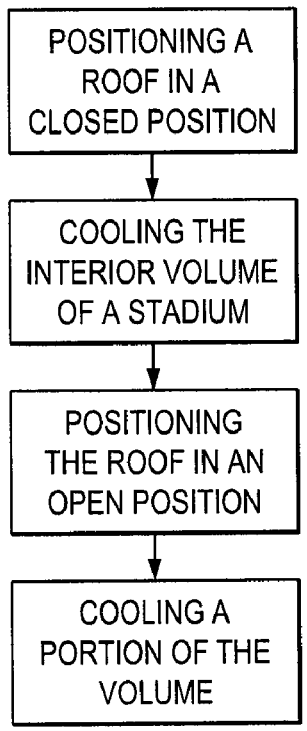
FIG. 28 illustrates a flow diagram for cooling the stadium.
Figure 29:
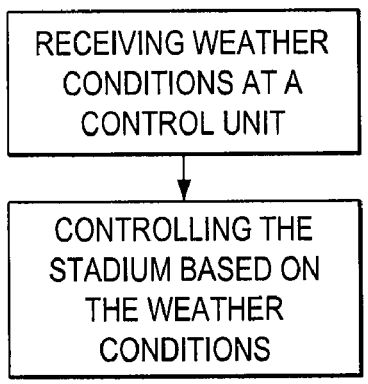
FIG. 29 illustrates a flow diagram for controlling the stadium.
Figure 30:
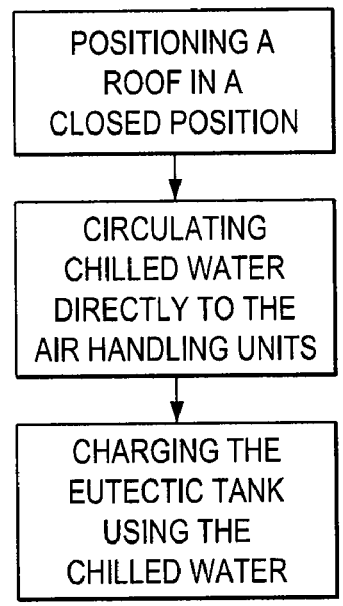
FIG. 30 illustrates a flow diagram for cooling the stadium.
Figure 31:
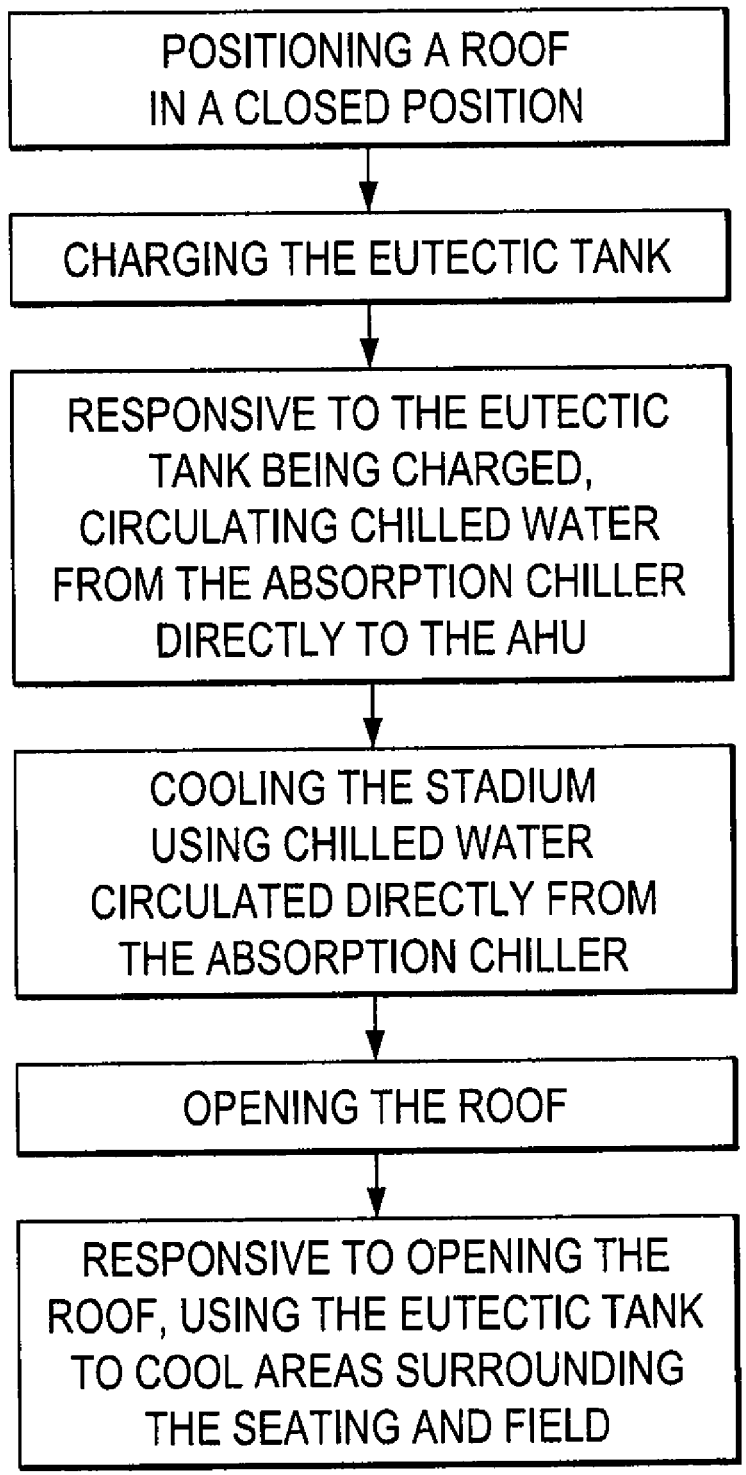
FIG. 31 illustrates a flow diagram for cooling the stadium.
Figure 32:
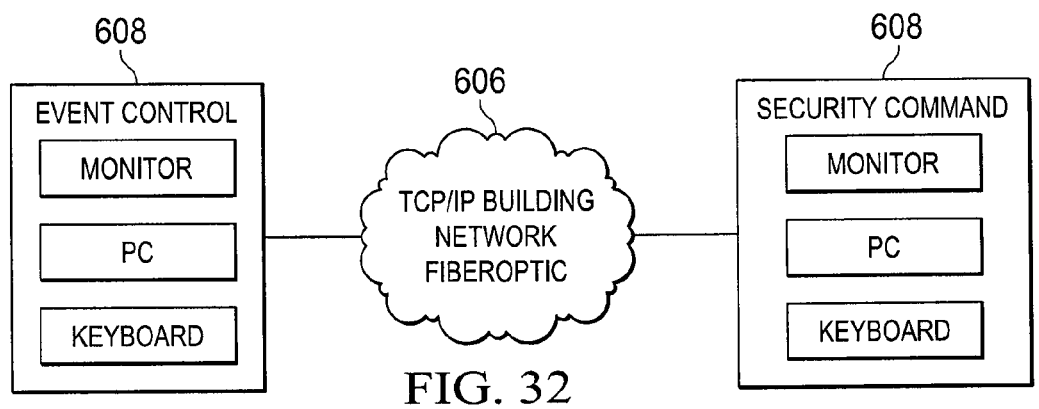
FIG. 32 illustrates a schematic diagram of a network.

Referring now to FIGS. 23-24, the zero-carbon energy infrastructure 104 for presenting a sustainable energy stadium infrastructure, as previously presented with reference to FIG. 1, is illustrated in more detail. The infrastructure 104 may be used in conjunction with the previously mentioned stadium 102. The infrastructure 104 may include a solar farm 502 connected to the public power grid 110 and a stadium power control subsystem 504. The solar farm 502 is configured to harness sufficient energy from the sun to provide lighting, heating, and power to offset energy used by the stadium 102.

The solar farm 502 includes a plurality of photovoltaic panels 506 and a plurality of solar heat collectors 508 positioned adjacent to the plurality of photovoltaic panels 506. The solar heat collectors 508 may include a plurality of motorized mirrors 516 that track the sun to focus a thermal energy from the sun onto a plurality of collecting tubes 518 to heat water circulating in the plurality of collecting tubes 518.

The solar farm 502 is connected to a heat storage tank 510 to store the heated water collected from the plurality of collecting tubes 518. An absorption chiller 512 is connected to the heat storage tank 510 and converts the energy from the heated water into chilled water. The water chilled from the absorption chiller 512 is then sent to a thermal storage tank 514 or a eutectic tank. A eutectic tank is a vessel containing packages of material that stores thermal energy from the surrounding thermo-fluid (in this case water) by changing phase, so changing from liquid to solid or vice versa. The eutectic tank 514 may be stored beneath the stadium 102. Chilled water can either be circulated directly to the air handling units 520 which supply chilled air to the various parts of the stadium 102 or via the eutectic tank 514 for supplying cooling to the plurality of air handling units 406 for distribution to the stadium 102. air handling units 406 are provided to supply air to the under-tier plenum 404 and hence to the interior 128. Another air handling unit supplies air to other spaces within the building including the upper terrace to the rear of the showcase and to the hospitality suite. This first air handling unit also supplies air to two diffusers 422 on either side of the pitch 118 to supplement the cooling of the pitch 118 in addition to that supplied under the seats 448.

Figure 33:
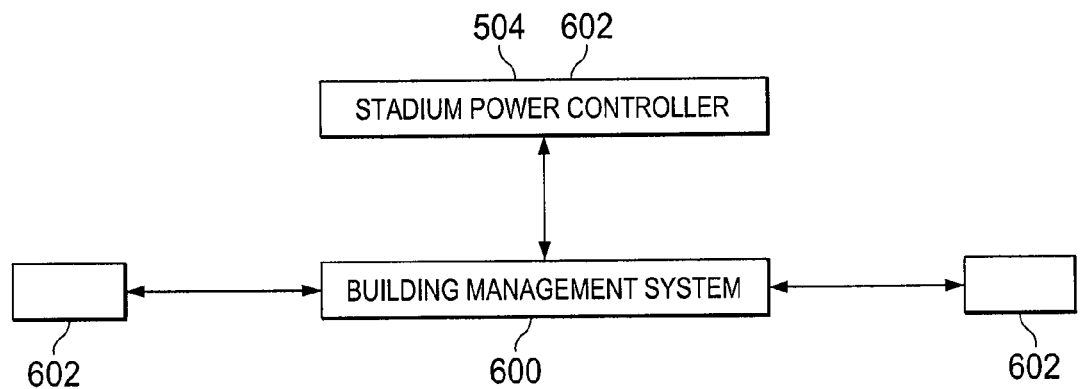
FIG. 33 illustrates a schematic diagram of building management system.

Referring now primarily to FIGS. 28-33, the zero carbon stadium infrastructure 100 further includes a building management system 600 (BMS) to monitor and centrally coordinate the infrastructure's 100 operation. The BMS 600 is based upon a network of intelligent controllers 602, such as stadium power controller 504, for controlling the MEP plant and equipment within the stadium 102. The controllers 602 will carry out control and monitoring functions of the services plant. The controllers 602 will execute, using defined software, all necessary optimization, time and temperature requirements for the mechanical plant and equipment, ensuring that the building services operate safely and efficiently. While three controllers 602 are illustrated in FIG. 33, it should be appreciated that more or less controllers 602 may be used based on the control needs of the stadium 102.

The controllers 602 will be linked via a communications network 606 to a central operators station. The operators station will be web enabled and will act as a viewing platform only for the control functions carried out by the controllers 602. The controllers 602 will be complete with power supplies, a real time clock, input and output modules, memory, processors and all other items necessary for proper and correct interfacing and operation of the plant control functions. The controllers 602 will have peer-to-peer communications as well as standalone capability such that a failure of the operator's station will still permit the plant and controls associated with the controllers 602, to continue to operate normally with the controllers 602 continuing to communicate with one another.

In the event of transmission failure in the controller network 606 the controllers 602 will continue to operate with all sequence interlocks and control strategies operating normally excepting those which require global information. Either user adjustable default values or the last sensed value will then be assume for these global parameters.

In the graphics mode, the operator's station will provide automatic updating of real time field data. Each graphic will incorporate up to 40 freely assigned connected or calculated points. Graphics will be available via the intranet/internet.

A method of cooling an interior volume of an indoor/outdoor stadium 102 prior to an event includes the positioning the roof in a closed position 176 at least 24 hours prior to the event; cooling the interior volume of the stadium 102 using cooling units while the roof is in the closed position 176; positioning the roof in an open position 178 prior to the event; and cooling only a portion of the interior volume using the cooling units during the event. The event may be held at a time selected in response to environmental factors.

In one embodiment of stadium 102, an automated control system is utilized to control the roof and other movable aspects of stadium 102. For example, while the positioning of movable roofing system 114 may be adjusted in response to a real-time human interaction such as flipping a switch or manipulating another actuator, in certain embodiments the position may be automatically adjusted in response to environmental conditions, indicated preferences, or rules imposed by a rules-based engine. Environmental conditions may include the position of the sun, precipitation, temperature, wind strength, wind direction, the radiant temperature of the stadium 102 or any surrounding ground or structure, time of day, day of the year, or any other suitable condition relevant to best achieving a comfortable stadium environment or reducing energy consumption. Indicated preferences may include a desired temperature, degree of shading, level of energy consumption, or any other preference expressed by a user of the control system that may also be relevant to achieving a comfortable stadium environment or reducing energy consumption. Rules may include rules and guidelines for the operation of movable aspects of stadium such as movable roofing system 114. For example, one rule may be that the roof may not move during the course of a football match, or only at certain times during the match. Other rules may interact with observed environment conditions to only allow certain positions of a roof based on observed environmental conditions. Each of the foregoing conditions, preferences, and rules may be stored into a memory associated with the automated control system and accessed and utilized by a processor of the automated control system in order to automatically determine the appropriate position of movable aspects of stadium 102. Such a determination may be made on a regular basis, such as every 5 minutes, or only prior to the beginning of each football match once per game, or at any other suitable time or interval. The appropriate position can then be compared by the processor to the current position of the movable aspects of stadium 102 and any necessary adjustment determined. Such adjustment can then be communicated to all necessary actuation systems of the movable aspects to physically adjust the position of those aspects. In one embodiment, environmental conditions may be taken directly from a weather station or other observation device or instrument mounted directly on stadium 102 or otherwise proximal to its location. In another embodiment, they may be received from a remote weather station such as a government weather station, airport, website, or other suitable source for environmental conditions. Any suitable combination of instruments and monitoring devices may be used to provide environmental condition information to the automated control system. The automated control system may be equipped with suitable user interfaces for providing conditions, preferences, and rules and displaying current conditions and the current position or movement of each moveable aspect of stadium 102. In such a manner, the automated control system provides a real-time responsiveness to the moveable aspects of stadium 102 to quickly and automatically respond to changes in environmental conditions that may impact the comfort of spectators and players and better preserve energy.

It should be apparent from the foregoing that an invention having significant advantages has been provided. While the invention is shown in only a few of its forms, it is not just limited but is susceptible to various changes and modifications without departing from the spirit thereof.

What is claimed:

1. A revolving canopy roof for a stadium, the roof comprising:
   a fixed half dome comprising:
      an outer layer clad with a plurality of shading tents comprising a plurality of triangular shading panels;
      an inner layer clad with a plurality of triangular ethylene tetraflouroethylene panels; and
      a plurality of bracing elements connecting the outer layer to the inner layer, the plurality of bracing elements offsetting the outer layer from the inner layer to permit airflow between the outer layer and the inner layer; and
   a revolving half dome comprising:
      an outer layer clad with a plurality of shading tents comprising a plurality of triangular shading panels;
      an inner layer clad with a plurality of triangular ethylene tetraflouroethylene panels; and
      a plurality of bracing elements connecting the outer layer to the inner layer, the plurality of bracing elements offsetting the outer layer from the inner layer permit airflow between the outer layer and the inner layer.

2. The roof of claim 1, wherein the plurality of shading panels for both the fixed half dome and the revolving half dome have a solar reflectance index equal to or greater than 78.

3. The roof of claim 2, wherein the plurality of shading tents cover at least 75 percent of the outer layer.

4. The roof of claim 1, wherein for both the fixed half dome and the revolving half dome, the outer layer is offset from the inner layer by at least 1500 mm.

5. The roof of claim 1, wherein for both the fixed half dome and the revolving half dome the plurality of bracing elements form a truss configuration.

6. The roof of claim 1, wherein the outer layer and the inner layer are comprised of steel elements.

7. The roof of claim 1, wherein for both the fixed half dome and the revolving half dome the geometry of the outer layer is configured to minimize a number of different sized triangular shading panels and create circular symmetry approximately every 60 degrees.

8. The roof of claim 1, wherein for both the fixed half dome and the revolving half dome the plurality of triangular shading panels on the outer layer creates a stiff diaphragm to resist spreading.

9. A stadium having a rotatable roof, the roof comprising:
   a fixed half dome roof having a first center point, the fixed half dome roof comprising:
      a curved inner framework having a first side and a second, opposing side;
      a plurality of ethylene tetrafluroethylene pillows positioned on the second side of the curved inner framework;
      a curved intermediate framework having a first side and a second, opposing side, the first side of the curved intermediate framework connected to the second side of the curved inner framework, the curved intermediate framework having a trussed configuration;
      a curved secondary intermediate framework having a first side and a second, opposing side, the first side of the secondary intermediate framework being positioned on the second side of the curved intermediate framework; and
      a plurality of solar hoods supported by the curved secondary intermediate framework, the plurality of solar hoods cascaded along the curved secondary intermediate framework; and
   a rotatable half dome roof having a second center point coincident with the first center point, the fixed half dome roof comprising:
      a curved inner framework having a first side and a second, opposing side;
      a plurality of ethylene tetrafluroethylene pillows positioned on the second side of the curved inner framework;
      a curved intermediate framework having a first side and a second side, the first side of the curved intermediate framework connected to the second side of the curved inner framework, the curved intermediate framework having a trussed configuration;
      a curved secondary intermediate framework having a first side and a second side, the first side of the curved secondary intermediate framework being positioned on the second side of the curved intermediate framework; and
      a plurality of solar hoods supported by the curved secondary intermediate framework, the plurality of solar hoods cascaded along the curved secondary intermediate framework;
   wherein the rotatable half dome roof rotates relative to the fixed half dome roof.

10. The stadium of claim 9, wherein the fixed half dome roof has a first diameter greater than a second diameter of the rotatable half dome roof.

11. The stadium of claim 9, wherein the fixed half dome roof has a first diameter less than a second diameter of the rotatable half dome roof.

12. The stadium of claim 9, wherein for both the fixed half dome and the rotatable half dome the plurality of solar hoods overlap.

13. The stadium of claim 12, wherein an overlap between the plurality of solar hoods creates a plurality of openings permitting air flow and sunlight.

14. The stadium of claim 13, wherein the plurality of openings face North.

15. The stadium of claim 13, wherein the plurality of openings face South.

16. A stadium having a passive dome roof designed for reducing energy demand on the stadium, the passive dome roof comprising:
   an outer geodesic dome having a plurality of cascading tents, each tent having an opening to the atmosphere, the plurality of cascading tents having a number of different sizes dependent on a curvature of the roof, the plurality of cascading tents for reflecting thermal energy from a sun while allowing natural light and ventilation to permeate the outer geodesic dome;
   an outer geodesic frame supporting the plurality of cascading tents;
   a geodesic truss connected to a stadium wall support, the geodesic truss supporting the outer geodesic frame;
   an inner geodesic dome supported by the geodesic truss, the inner geodesic dome having a plurality of triangulated, transparent ethylene tetrafluoethylene membranes and a framework, a perimeter of each triangulated, transparent ethylene tetraflouethylene membrane is supported by the framework that further functions as a gutter.

17. The stadium of claim 16, wherein the passive dome roof further comprises a fixed, half-dome passive roof and a revolving, half-dome passive roof, wherein the revolving, half-dome passive roof revolves at least 180 degrees relative to the fixed, half-dome passive roof.

18. The stadium of claim 17, wherein the fixed, half-dome passive roof covers a West side of the stadium.

19. The stadium of claim 16, wherein the plurality of cascading tents overlap one another.

20. The stadium of claim 17, wherein the plurality of cascading tents positioned on the fixed, half-dome passive roof have a plurality of openings facing North.

* * * * *